(12) United States Patent
Nelson

(10) Patent No.: US 6,967,574 B1
(45) Date of Patent: Nov. 22, 2005

(54) MULTI-MODE ELECTROMAGNETIC TARGET DISCRIMINATOR SENSOR SYSTEM AND METHOD OF OPERATION THEREOF

(75) Inventor: Carl V. Nelson, Rockville, MD (US)

(73) Assignee: The Johns Hopkins University, Baltimore, MD (US)

( * ) Notice: Subject to any disclaimer, the term of this patent is extended or adjusted under 35 U.S.C. 154(b) by 177 days.

(21) Appl. No.: 10/742,046

(22) Filed: Dec. 19, 2003

Related U.S. Application Data

(60) Provisional application No. 60/441,431, filed on Jan. 21, 2003.

(51) Int. Cl.$^7$ .............................................. G08B 13/24

(52) U.S. Cl. .................. 340/551; 340/552; 340/572.2; 324/228; 324/239; 342/70

(58) Field of Search ............................... 340/551, 552, 340/572.2, 572.4, 572.7; 324/228, 239; 342/70

(56) References Cited

U.S. PATENT DOCUMENTS

| | | | |
|---|---|---|---|
| 5,414,411 A * | 5/1995 | Lahr | 340/551 |
| 5,576,624 A * | 11/1996 | Candy | 324/329 |
| 6,456,079 B2 * | 9/2002 | Ott et al. | 324/327 |
| 6,587,072 B1 * | 7/2003 | Gresham et al. | 342/70 |

* cited by examiner

*Primary Examiner*—Thomas J. Mullen, Jr.
*Assistant Examiner*—Samuel J. Walk
(74) *Attorney, Agent, or Firm*—Francis A. Cooch

(57) ABSTRACT

A multi-mode electromagnetic target discrimination sensor system for transmitting an electromagnetic signal and receiving a reflected signal from at least one target is disclosed having a variable inductance antenna having a variable inductance transmitter and a variable inductance receiver for varying at least one of operating bandwidth, sensitivity and size of the antenna, a processor for alternating between a time domain operating mode and a frequency domain operating mode, and controlling the variation of the inductance of the variable inductance antenna based on a current operating mode, and at least one processing algorithm for receiving signals from the receiver, discriminating targets from the received signals, and outputting the discrimination results is disclosed.

25 Claims, 16 Drawing Sheets

MULTI-MODE ELECTROMAGNETIC TARGET DISCRIMINATOR SENSOR SYSTEM AND METHOD OF OPERATION THEREOF

CROSS-REFERENCE TO RELATED APPLICATIONS

This application claims the benefit of U.S. Provisional Application No. 60/441,431, filed Jan. 21, 2003, the contents of which are incorporated herein by reference.

STATEMENT OF GOVERNMENTAL INTEREST

This invention was made with Government support under U.S. Army Contract No. DAAB15-00-C-1008. The Government has certain rights in the invention.

BACKGROUND OF THE INVENTION

1. Field of the Invention

The present invention generally relates to a multi-mode electromagnetic target discrimination sensor system and method of operation thereof. More particularly, the present invention relates to a metal detection sensor system that operates in both time and frequency domain modes.

2. Description of the Related Art

Current state-of-the-art electromagnetic induction (EMI) metal detectors can detect the small amount of metal in plastic-cased land mines at shallow depths under a wide range of environmental and soil conditions. However, small and large metal non-mine objects (clutter) commonly found in the environment are a major complication in mine detection because they represent false targets. It has been estimated that metal clutter in the environment causes between 100 and 1000 false alarms for each real land mine. For time-efficient and cost-effective landmine clearing, the detected metal targets must be classified as to their threat potential: mine or clutter.

Two basic types of electromagnetic induction metal detector technologies are commonly used for mine detection: pulsed or time domain (TD) and continuous wave (CW) or frequency domain (FD). Vacuum tube metal detectors based on FD techniques were used during WWII for mine detection and some of the basic patents on this technology date to the 1940s. TD metal detectors started to appear in the mid 1950s for geological exploration of minerals. At present, both technologies are well developed and use modern computerized electronics for their operation. Currently, FD technology dominates the hobbyist market for metal detection, but in the area of mine detection, both technologies are available and have shown similar detection sensitivities for low metal mines. State-of-the-art hobbyist metal detectors appear to be more sophisticated than military metal detectors and use modern microprocessors for detection and discrimination. In fact, in one test, a hobbyist FD metal detector preformed better than some military-grade metal detectors. Each technology has its advantages and disadvantages.

Some advantages and disadvantages of TD and FD metal detection technologies are summarized in Table 1 and Table 2, respectively.

TABLE 1

Advantages of TD and FD metal detection technologies

| TD Advantages | FD Advantages |
|---|---|
| Easier to separate ground and target response | High SNR for given conditions |
| Flexible antenna construction options | High sensitivity for small targets |
| Relatively easy to make high bandwidth measurements | More power efficient for a given target depth using resonance circuits |
| Faster spectral discrimination measurements | More sensitive to antenna/target orientation (an advantage and disadvantage) |
| Good metal target sensitivity in mineralized soil | Good broadband noise rejection |
| Target discrimination less affected by mineralized soil | |
| Easy to classify simultaneous void and metal signal | |

TABLE 2

Disadvantages of TD and FD metal detection technologies

| TD Disadvantages | FD Disadvantages |
|---|---|
| Lower SNR for given conditions | Slower spectral discrimination measurements |
| More power required for same FD sensitivity | Primary field rejection |
| Trade-off between bandwidth and sensitivity | More difficult to separate target and ground response |
| Poor broadband noise rejection without averaging | Lost sensitivity in mineralized and conductive soil and salt water |
| | Poor discrimination capability in mineralized soil |
| | Motion sensitive |

As the information above and below shows, TD and FD metal detection technologies have some overlapping capabilities in addition to their particular strengths and weaknesses. Fortunately, where one technology has a weakness the other technology has strength. For maximum sensitivity for a given total sensor power consumption, the FD technology possesses an advantage over the TD technology since a FD antenna can use resonance circuits to create a strong magnetic field for target detection. For target detection and discrimination, the TD technology can more easily separate mineralized and conductive soil and salt-water effects, compared to FD technology. In fact, some FD metal detectors have to ignore the signal (in-phase) from the mineralized soil so as not to overload the detector. Important information is then lost for target discrimination purposes. TD mode hobbyist metal detectors are used almost exclusively for underwater applications. Also, TD mode sensor excites the metal target with a continuous spectrum of frequencies based on the Fourier Transform of the TD sensor's transmitter current impulse compared to the discrete frequencies of the FD mode. For more detail, see also Carl V. Nelson, Toan Huynh and Charles Cooperman, "EMI Sensor with Both Time and Frequency Domain Technologies for Detection and Classification of Metal Objects," SPIE, FL, 2001. Proceeding of SPIE, Detection and Remediation Technologies for Mines and Minelike Targets, Poster, Orlando, Fla., 16–20 Apr. 2001, the contents of which are incorporated herein by reference.

Extensive research has been conducted on FD and TD metal detector technology and algorithms for target classification. The basic pulsed-EMI technique used for metal detection can be described as follows. A current loop transmitter is placed in the vicinity of the buried metal target, and a steady current flows in the transmitter. The transmitter loop current is then turned off. According to Faraday's Law, the collapsing magnetic field induces an electromotive force (emf) in nearby conductors. This emf causes eddy currents to flow in the conductors. Because there is no energy to sustain the eddy currents, they begin to decrease with a characteristic decay time that depends on the size, shape, and electrical and magnetic properties of the conductor. The decay currents generate a secondary magnetic field, the time rate-of-change of which is detected by a receiver coil located above the ground. The signal received by the receiver coil is a combination of the eddy currents from the metal target as well as the soil.

In the TD mode, the eddy current time decay response from a metal target can be expressed as $$V(t) = \delta(t) - \sum_i [A_i \exp\{-t/\tau_i\}] \qquad \text{Equation (1)}$$

where t is time, V(t) is the induced voltage in the receiver coil, $\delta(t)$ is the delta function, $A_i$ are target amplitude response coefficients, and $\tau_i$ are the target's time constants. Thus, the sensor response to a metal target is a sum of exponentials with a series of characteristic amplitudes, $A_i$, and time constants, $\tau_i$. A similar expression can be written for a FD sensor. Equation (1) forms the theoretical basis of an EMI sensor's classification technique. If a target is shown to have a unique time decay or frequency response, a library of potential threat targets can be developed. When a metal target is encountered in the field, its time decay or frequency response can be compared to those in the library and, if a match is found, the target can be classified.

U.S. Pat. No. 5,387,900 discloses an electronic article surveillance (EAS) system with improved processing of antenna signals. The EAS system in which first and second received signals are independently front-end processed to produce third and fourth signals indicative of the absolute values of the first and second processed signals. The third and fourth signals are then combined and the combined signal passed to a tag evaluation processor for time and frequency domain processing for evaluating whether a tag is present in an interrogation zone. The front-end processing is carried out in such a way that interference signal content including shield interference is extracted without extracting tag signal content in the received signals over a period of time. In this way, the first and second transmitter antennas of the system can be driven with drive signals having a phase difference of other than 0.degree. or 180.degree. and the tag evaluation processing can be carried out during the entire period of the drive signals. The EAS uses a frequency domain signal in the transmitter circuit to excite a special response from the article surveillance tag placed on an object that is being protected from theft. The article surveillance tag is tuned to the frequencies that are transmitted.

U.S. Pat. No. 5,699,045 discloses an EAS system with cancellation of interference signals. The EAS system includes a signal generator for generating an interrogation signal (e.g., frequency domain) in an interrogation zone, an antenna which receives a signal present in the interrogation zone, and interference canceling circuitry for canceling interference components in the signal received by the antenna. The interference canceling circuitry includes a hybrid interference component canceling loop in which a digital interference estimate signal is formed and converted into an analog estimate signal, and the analog estimate signal is subtracted from an input analog signal. The resulting difference signal is processed with a hybrid automatic gain control loop. A digitized signal, formed from the resulting difference signal, is subjected to digital interference cancellation processes in addition to the hybrid interference component cancellation process. Each of the digital interference cancellation processing and the hybrid interference component cancellation loop entails performing a respective polyphase decomposition of a digital input signal, estimating a mean value of each of the resulting subsequences, and combining the estimated mean values to form an interference component estimate signal. An input sample window provided for a comb-filtering stage is adjusted in phase relative to the cycle of the interrogation signal to compensate for changes in phase of the marker signal to be detected.

U.S. Pat. No. 5,103,234 discloses an electronic article surveillance system. The magnetic article surveillance system utilizing microcomputer control and unique time domain and frequency domain information gathering channels whose information is processed by the microcomputer via preselected time domain and frequency domain criteria.

U.S. Pat. No. 4,859,991 discloses an electronic article surveillance system employing time domain and/or frequency domain analysis and computerized operation. The magnetic article surveillance system also utilizes microcomputer control and unique time domain and frequency domain information gathering channels whose information is processed by the microcomputer via preselected time domain and frequency domain criteria.

U.S. Patent Publication No. 2003/0016131 discloses a wide area metal detection (WAMD) system and method for security screening crowds. The Wide Area Metal Detection (WAMD) system and method for security screening a crowd of people is provided. The system comprises at least one Magnetic Field Generator (MFG), e.g., a Horizontal Magnetic Field Generator (HMFG) buried below a walking surface for generating a magnetic field, a plurality of magnetic field sensors located within the sensing area of the MFG for sensing a metallic object, based on eddy currents in the magnetic field, and a location indicator for indicating a location of an individual with the metallic object at a position corresponding to that of one of the plurality of magnetic field sensor that sensed the metallic object. At least one video camera is included for identifying the individual at the location indicated by the location indicator and tracking further movements of the individual.

U.S. Patent Publication No. 2003/0034778 discloses a portable metal detection and classification system. The metal detector system including a chassis for supporting electromagnetic sensor components above a medium such as soil or water. A transmitter coil and two receiver coils are attached to the chassis. A propulsion system is attached to the chassis between or adjacent to the receiver coils. The location of the propulsion system causes electromagnetic interference signals emanating from the propulsion system to be received at a nominally equal magnitude by each of the receiver coils.

U.S. Patent Publication No. 2003/0016131 discloses a steerable three-dimensional magnetic field sensor system for detection and classification of metal targets. The steerable electromagnetic induction (EMI) sensor system for measuring the magnetic polarizability tensor of a metal target. Instead of creating a vertical magnetic field from a horizontal loop transmitter configuration used by most prior art EMI metal detectors, the transmitter geometry of the sensor system's antenna is designed especially for creating multiple horizontal and vertical magnetic fields and for steering the same in all directions. The horizontal magnetic field (HMF) antenna has the potential advantage of a relatively uniform magnetic field over a large volume. A second potential advantage of the HMF antenna is that compared to a conventional loop antenna, the magnetic field intensity falls off slowly with distance from the plane of the antenna. Combining two HMF sensor systems creates a steerable two-dimensional magnetic field sensor. Combining the steerable HMF sensor with a vertical magnetic field antenna forms a three-dimensional steerable magnetic field sensor system.

U.S. Patent Publication No. 2003/0052684 discloses an electromagnetic target discriminator sensor system and method for detecting and identifying metal targets. The time-domain electromagnetic target discriminator (ETD) sensor system and method are provided capable of measuring a metal target's time decay response based on the physical parameters of the metal target and its environment and for identifying the metal target. The ETD sensor system includes a pulse transmitter connected to a receiver via a data acquisition and control system. The transmitter and receiver include coil configurations for placement in proximity to a visually obscured, e.g., buried, metal target (or underground void) for inducing eddy currents within the metal target. The ETD sensor system measures the eddy current time decay response of the metal target in order to perform target recognition and classification. The identification process entails comparing the metal target's (or, underground void or other object's) time decay response with a library of normalized object signatures, e.g., time decay responses and other characteristics.

Prior art metal detectors do not address the operation of a metal detector for both time multiplexed TD and FD modes with the antenna (transmitter and receiver coils) optimized for metal detection and target classification under all soil conditions. Multiple frequency FD mode metal detectors use a single transmitter and receiver coil configuration that just changes the transmitter resonance frequency without changing either the transmitter or receiver coil turns. TD mode metal detectors do not use variable antenna configurations to optimize the antenna to the target characteristics.

SUMMARY OF THE INVENTION

Accordingly, the present invention has been designed to solve the above and other problems occurring in the prior art by providing a system and method for a multi-mode electromagnetic target discrimination sensor, and in particular metal detection and discrimination that operates in both time and frequency domain modes with the capability of optimizing its transmitter and receiver antenna configuration.

In accordance with one embodiment of the present invention, a multi-mode electromagnetic target discrimination sensor system for transmitting an electromagnetic signal and receiving a reflected signal from at least one target is provided comprising a variable inductance antenna having a variable inductance transmitter and a variable inductance receiver for varying at least one of operating bandwidth, sensitivity and size of the antenna; a processor for alternating between a time domain operating mode and a frequency domain operating mode, and controlling the variation of the inductance of the variable inductance antenna based on a current operating mode; and at least one processing algorithm for receiving signals from the receiver, discriminating targets from the received signals, and outputting the discrimination results.

In accordance with another embodiment of the present invention, a method of target discrimination in a multi-mode electromagnetic target discrimination system is provided comprising the steps of (a) setting an antenna, having at least one transmitter coil winding and at least one receiver coil winding, to a frequency domain mode, transmitting frequency domain mode signals, and receiving reflected frequency domain mode signals; (b) processing in processing circuitry the received frequency domain signals to classify the frequency domain signals; (c) setting the antenna to a time domain mode, transmitting time domain mode signals, and receiving reflected time domain mode signals; (d) processing in the processing circuitry the received time domain signals to classify time domain signals; and (e) returning to step (a).

In accordance with another embodiment of the present invention, a method of target discrimination in a multi-mode electromagnetic target discrimination system is provided comprising the steps of (a) detecting at least one of a frequency domain (FD) signal and time domain (TD) signal from reflected electromagnetic signals; (b) if a FD signal is detected, classifying the FD signal; (c) if a TD signal is detected, classifying the TD signal; (d) comparing the classified FD and TD signals; (e) outputting the comparison results; and (f) returning to step (a).

BRIEF DESCRIPTION OF THE DRAWINGS

The above and other objects, features, and advantages of the present invention will be more apparent from the following detailed description taken in conjunction with the accompanying drawings.

DETAILED DESCRIPTION OF THE PREFERRED EMBODIMENTS

Figure 1:
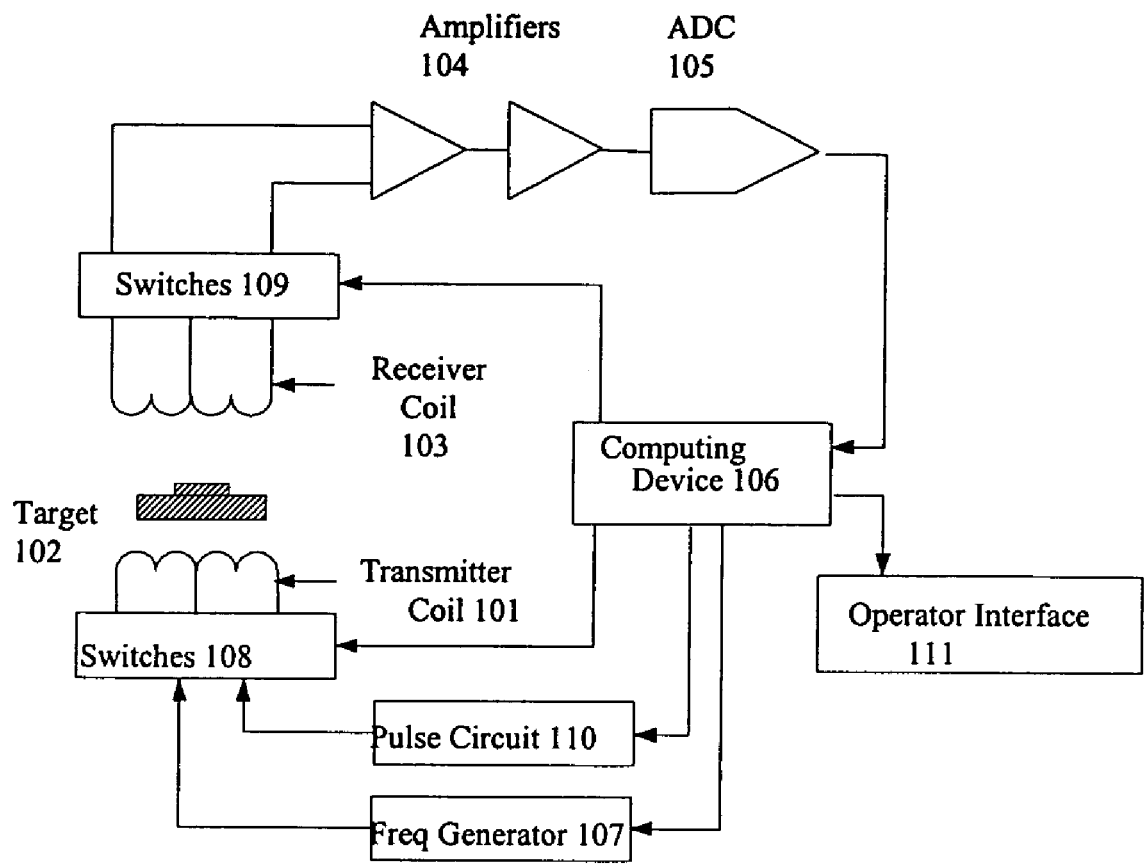
FIG. 1 is a simplified block diagram of a multi-mode electromagnetic target discriminator (METD) according to an embodiment of the present invention.

Preferred embodiments of the present invention will be described in detail herein below with reference to the accompanying drawings. In the following description of the present invention, a detailed description of known functions and configurations incorporated herein will be omitted when it may obscure the subject matter of the present invention.

A first embodiment of the present invention includes at least a combined time-domain (TD) and frequency-domain (FD) metal detector and target classification algorithm (TCA) that utilizes the best features of both electromagnetic induction (EMI) technologies for metal target detection and discrimination. This multi-mode electromagnetic target discriminator (METD) sensor utilizes automatic ground balance technique and void detection capability of the electromagnetic target discriminator (EDT) described in Carl V. Nelson, Charles B. Cooperman, Wolfger Schneider, Douglas S. Wenstrand and Dexter G. Smith, "Wide Bandwidth Time-domain Electromagnetic Sensor for Metal Target Classification," IEEE TGARS, Vol. 39, No. 6, pp 1129–1138, June 2001; Carl V. Nelson and Toan B. Huynh, "Wide Bandwidth, Time Decay Responses from Low-metal Mines and Ground Voids," SPIE, FL, 2001. Proceeding of SPIE AeroSense 2001 Conference, Detection and Remediation Technologies for Mines and Minelike Targets, Orlando, Fla., 16–20 Apr. 2001; Carl V. Nelson and Toan B. Huynh, "Spatial Scanning Time-domain Electromagnetic Sensor: High Spatial and Time Resolution Signatures from Metal Targets and Low-metal Content Land Mines," Proceeding of SPIE AeroSense 2002 Conference, Detection and Remediation Technologies for Mines and Minelike Targets Orlando, Fla., April 2002; Carl V. Nelson, Dexter G. Smith and Charles B. Cooperman, "Electromagnetic Target Discriminator Sensor System and Method for Detecting and Identifying Metal Targets," patent pending 2001; the contents of each of which are incorporated herein by reference.

The METD sensor has the capability of being deployed in conjunction with additional mine detection technologies such as a ground penetrating radar (GPR) or IR sensors. In addition, the METD sensor can be deployed as a single sensor for individual operation or in an array for more rapid area coverage from a robotic platform.

The preferred embodiment of the present invention uses a transmitter coil and two receiver coils in a differential configuration for primary transmitter field bucking and automatic ground balancing. However, different transmitter and receiver coil (i.e. antenna) configurations are possible as long as the requirements of the TD and FD modes are satisfied as will be described in detail below. As noted in Tables 1 and 2, the FD mode is the mode that requires special antenna configuration attention since the primary transmitter field must be minimized in the receiver coil.

The METD sensor addresses the need for an advanced metal detector. With the present state of sensor development, it has been well established in the research community that a combined metal detector and GPR sensor system (and possibly other sensor technologies) would represent the most promising approach to optimal mine detection. The METD sensor will improve the performance of the combined mine detection system by improving and expanding the capabilities of a conventional metal detector. The METD sensor system has the following characteristics not presently found in conventional metal detectors: time-multiplexed TD and FD operation; switching circuitry that configures the transmitter and receiver coils for either TD or FD operation; variable inductor transmitter and receiver coil optimized for TD or FD operation; variable inductor transmitter and receiver coil optimized for TD high bandwidth operation; variable inductor transmitter and receiver coil optimized for TD low bandwidth and high sensitivity operation; variable inductor transmitter and receiver coil optimized for FD high bandwidth operation; variable inductor transmitter and receiver coil optimized for FD low bandwidth and high sensitivity operation; variable inductor transmitter and receiver coil realized via switches connecting coils in series or parallel combinations to achieve high and low bandwidth operation; FD operation use resonance circuit for high power efficiency and high metal detection sensitivity operation for small metal target detection; automatic adjustable bandwidth and sensitivity control for either FD or TD operation to aid accurate target discrimination; high power efficiency and high sensitivity FD operation for small metal target detection; FD ferrous/non-ferrous classification; target classification algorithm (TCA) via target spectral and spatial response signature; single sensor or sensor array operation; and differential antenna configuration for passive and automatic ground balancing and primary field cancellation in FD mode.

A resonance circuit FD mode sensor can theoretically generate a higher magnetic field (compared to a TD sensor of the same power consumption operating at 50% duty cycle) and thus may be more sensitive to deep small metal targets. A TD mode sensor can theoretically generate more excitation frequencies (compared to an FD sensor in a given time interval) for accurate target classification. Although the preferred embodiment of the present invention uses only two frequencies in the FD mode, important target properties may be obtained by using more frequencies or a chirp frequency spectrum to excite a target. For discussion purposes, the sensor description details below are for two frequencies and one TD pulse mode sequence.

A simplified diagram of the METD sensor is shown in FIG. 1. The basic operation of the METD sensor is that of a conventional metal detector. In the TD mode, a transmitter coil 101 is excited with a series of current pulses. When the current is switched off in the transmitter coil 101, eddy currents are generated in nearby conductors, i.e. target 102. The decaying eddy currents generate a changing magnetic flux sensed by a receiver coil 103. One skilled in the art knows that the magnetic field from the target eddy currents can also be measured by a other magnetic field sensors known in the art, e.g., flux-gate magnetometers and magnetoresistors. The changing magnetic flux generates a voltage that is then amplified by amplifier 104 and digitized by an analog-to-digital converter (ADC) 105. The data collection is controlled by a computing device (CD) 106. The CD 106 also performs data averaging, detection functions, target classification and operator interface functions. The CD 106 can be implemented by a field programmable gate array (FPGA) or a processor.

In FD mode, the CD 106 controls a controllable variable frequency sine wave generator 107. One or more frequencies are generated and interact with the metal target 102. The amplifier 104 and ADC 105 circuits again measure the received signals. The CD 106 collects the data and performs a digital equivalent of a synchronized detector (e.g., lock-in-amplifier), measuring amplitude and phase.

One of the main differences between a conventional metal detector and the METD according to the present invention is the addition of the transmitter switches 108 and receiver switches 109. The switches reconfigure the transmitter coils 101 and receiver coils 103 for optimal TD or FD operation for maximum target sensitivity or target classification capability.

A pulse circuit 110 uses a programmable current or voltage source switched by a high-speed MOSFET. The CD 106 adjusts the current level so as not to saturate the receiver circuits when a large metal target is being sensed. In the FD mode, the transmitter coil operates in a resonance circuit so as to maximize the current flowing in the coil. Different capacitors (not shown) are switched into the transmitter coil 101 circuitry depending on the operating frequency. For the TD mode, the same high-speed, low-noise pre-amplifier that is used by the EDT sensor, disclosed in Patent Publication No. 2003/0052684, incorporated herein by reference, is used herein. Also, in the FD mode a switch can direct the receiver coils to a low-frequency, low-noise amplifier circuit more suited to the FD operation. A low-powered, 14-bit, 10 Ms/s ADC is used to digitize the signal of the ETD sensor. The sample rate in TD mode is initially set to 10 Ms/s, but can be changed based on the target parameters.

The CD 106 controls sensor timing, automatic gain and time window control functions, ADC operation, synchronous detection (FD mode), data averaging (TD and FD mode) and basic metal detection. Also shown in FIG. 1 is operator interface 111, which provides user control of the system and contains input/output devices such as a display and alarms. Other input/output devices are contemplated.

Figure 2:
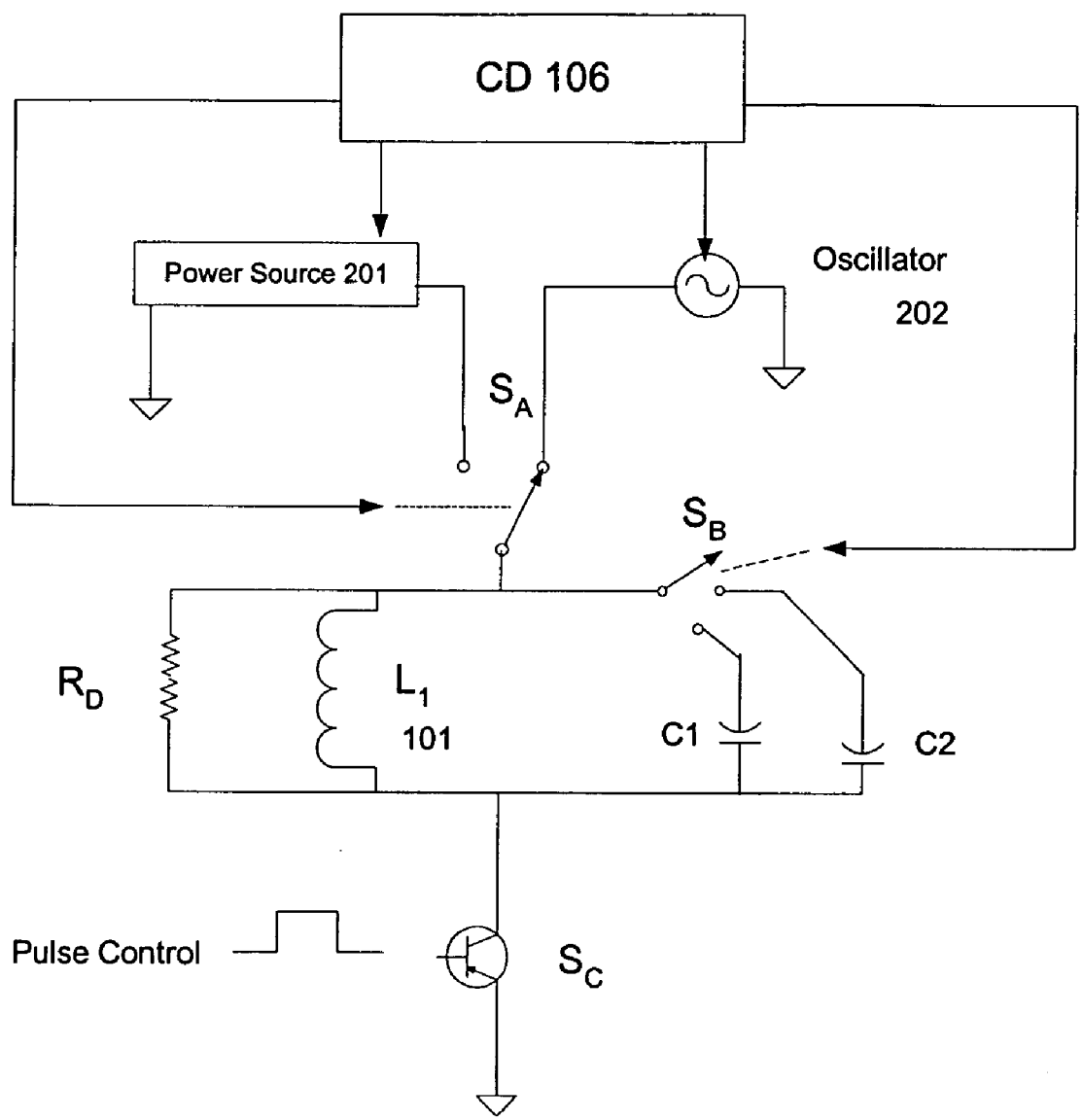
FIG. 2 is a block diagram of a basic transmitter coil arrangement of the METD for either time domain or frequency domain operation.

FIG. 2 is a block diagram of the transmitter coil 101, the configuration of its switch 108, and controlling circuitry according to an embodiment of the present invention. Basically, the device creates a variable induction loop for the transmitter coil 101 that is optimized for either high bandwidth (HB) or low bandwidth (LB) TD and FD operations. A similar block diagram is shown later for the receiver coil 103 and its switch 109 configuration, again optimized for HB and LB operation. For simplicity, the transmitter coil 101 configuration will be discussed first. It will be instructive to describe the multi-mode operation using the same transmitter coil 101 (or "$L_1$" in the figure) for both TD and FD modes. The position of switch $S_A$ is controlled by the CD 106. With $S_A$ in the TD mode, the CD 106 controls the operation of a programmable current or voltage source (shown as power source 201). Pulse operation in the TD mode is controlled by a high-speed electronic switching component, $S_C$ (e.g., transistor as shown) under control of CD 106. Resistor $R_D$ is used to dampen oscillations in the transmitter coil 101. Using feedback from the receiver measuring circuit (not shown), the CD 106 adjusts the current level so as not to saturate the receiver circuits when a large metal target is being sensed (alternatively, the amplifier gain could be controlled so as not to saturate). With $S_A$ in the FD mode, $S_C$ is set closed, the transmitter coil, $L_1$, will be operated in a resonance circuit with capacitor $C_1$ so as to maximize the current flowing in the transmitter coil 101 with minimal power from the system power supply 201 (typically a battery to generate a low impedance direct current power source). Different capacitors (e.g., $C_2$) could be used and switched by switch $S_B$ into the transmitter coil circuit depending on the desired operating frequency. Oscillator 202 is shown in FIG. 2 and is used in FD mode as discussed below.

Figure 3:
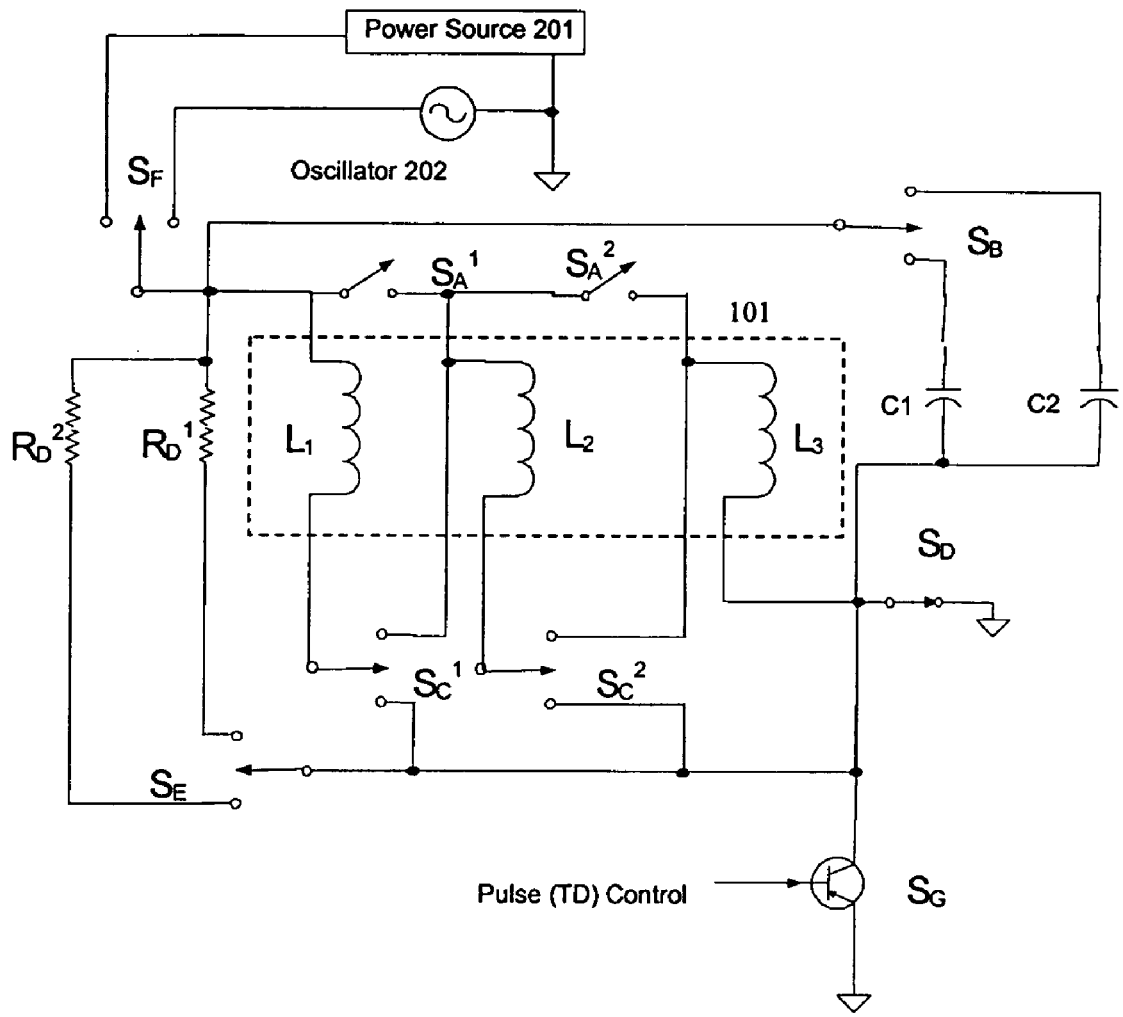
FIG. 3 is a block diagram of a basic multiple switch configuration of the METD.

A more detailed embodiment of the transmitter coil 101 and its switching circuitry is shown in FIG. 3. Here the transmitter coil 101 can be configured to be optimized for either TD or FD mode depending on the bandwidth requirements of the measurement. FIG. 3 is the general configuration of the circuit. For different operating conditions, the switches shown in FIG. 3 are placed in different positions. The transmitter coil 101 is composed of multiple coaxial turns of wire $L_1$, $L_2$ and $L_3$ forming a general transmitter coil. The different coil windings are connected via switches $S_A^1$, $S_A^2$, $S_C^1$, $S_C^2$ and $S_D$ to form a coil with different bandwidth and sensitivity. All switches are understood to be controlled by the CD 106. Switch $S_G$ is shown as a transistor switch which is characteristic of a high-speed high current switching circuit such as a power MOSFET or IGBT. The other switches can be electronic or electromechanical. In general, they need not be high speed since they are operated when the METD is changing modes of operation. Typically, these switches are selected based on their on resistance, capacitance and inductance characteristics, and current carrying capacity.

Consider the case where we desire high bandwidth (HB) in the metal detector. HB is needed for detection and classification of ground voids (e.g., in mineralized soil) and fast decaying metal targets. A transmitter coil (and also a receiver coil) is an inductor with a relatively high inductance due to the relatively large diameter of the coil. The large coil diameter (typically in the range of 5 to 12 inches in diameter) is needed to project a strong magnetic field deep into the ground for exciting eddy currents in the metal object. Adding coil turns to the transmitter increases the inductance by the square of the number of turns. Other things being equal, high inductance limits bandwidth. Therefore, the desired configuration of a transmitter coil is one that has a few turns. The same augment applies to the receiver coil. Unfortunately, a low number of transmitter and receiver coil turns translates into relatively low sensor sensitivity to metal. However, due to dB/dt, a HB target generates a relatively high voltage at the output of the receiver coil. Some of the lost signal detection capability is gained by the dB/dt response characteristic of a fast decaying target.

Figure 4:
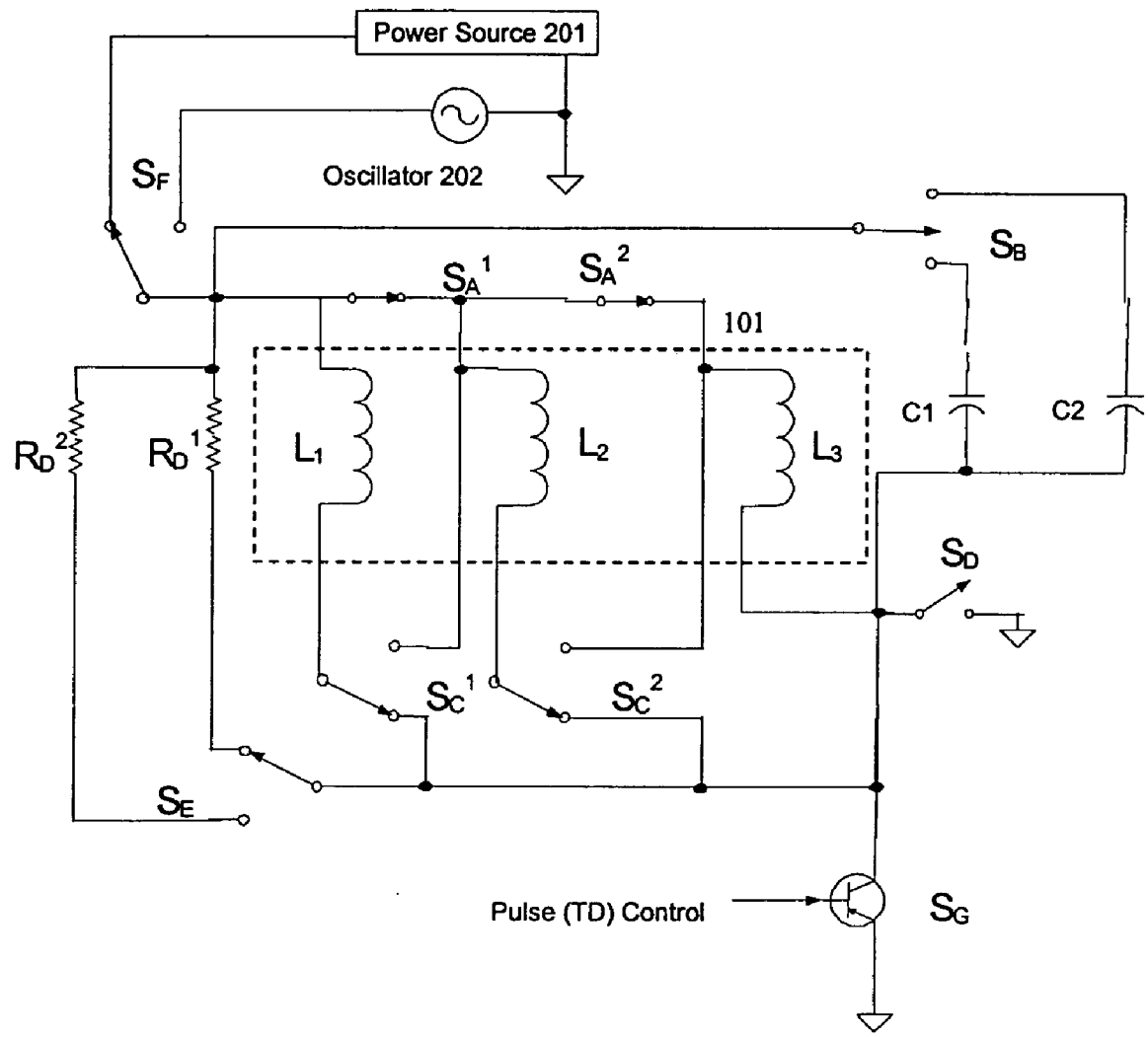
FIG. 4 is a block diagram of a high bandwidth (HB) time domain (TD) mode of the METD.

FIG. 4 shows the configuration for HB TD mode operation. The objective of the FIG. 4 switch configuration is to create a low inductance circuit, and hence HB transmitter coil for TD operation. $S_F$ is connected to the power supply. Switches $S_A$ (1 and 2; or more) are closed. Switches $S_C$ (1 and 2; or more) are open. Switches SE (1, 2, 3 and 4; or more) are closed. Switches $S_B$ and $S_D$ are open. $S_G$ controls the fast pulse operation. This configuration of the switches places the multiple turns (represented by L1, L2 and L3) of the coaxial transmitter windings in parallel. The wires are close together and essentially form a single wire with multiple strands. If $L_1=L_2=L_3=L$, the inductance is approximately L and the resistance is calculated by the parallel resistor rule and hence is lower than the individual winding resistance. The lower equivalent coil resistance improves the current carrying capacity of the coil and sensor. $R_D$ is a damping resistor. The time constant of the transmitter coil is approximately $L/R_D$: the lower the time constant the higher the bandwidth of the coil. It has been determined, for typical fast decay metal targets and ground voids characteristic of land mines, that a transmitter coil bandwidth greater than 1 MHz is desirable.

Figure 5:
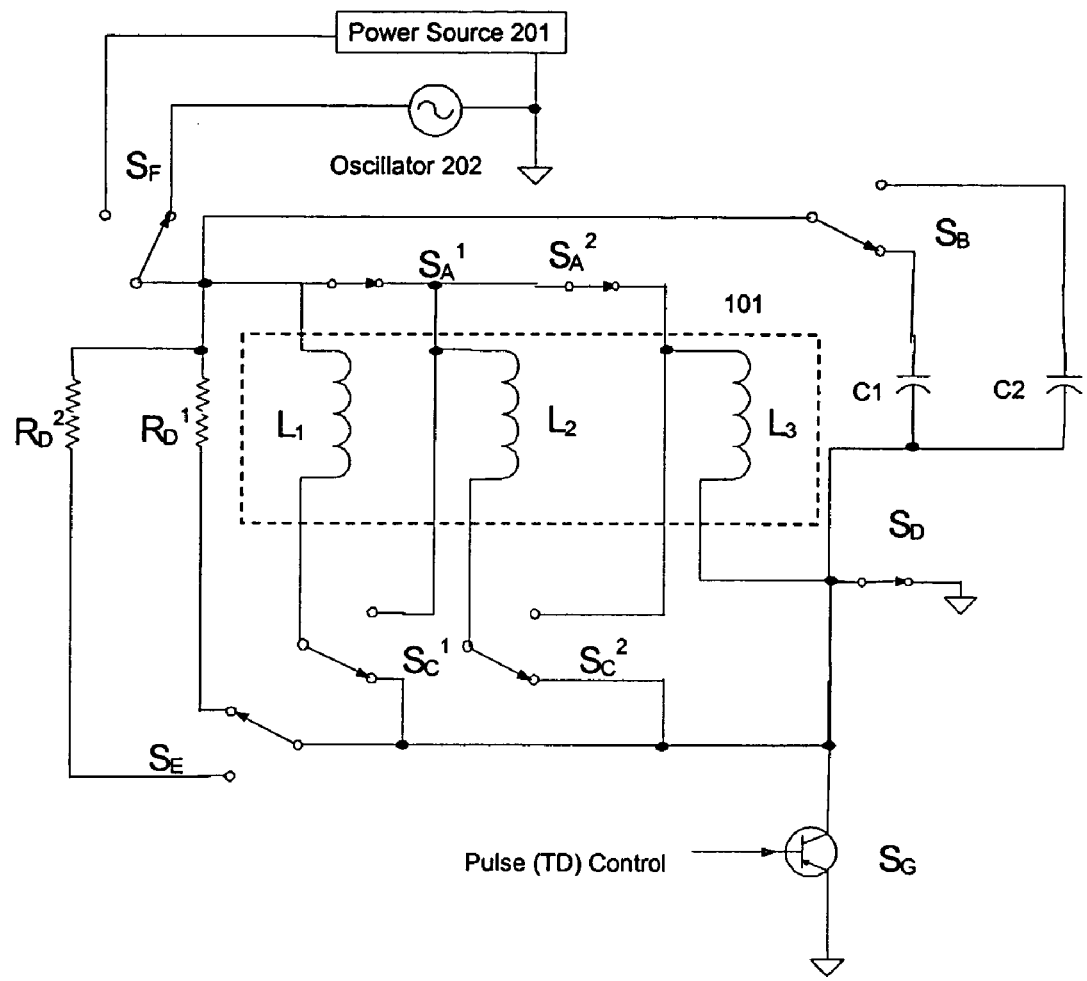
FIG. 5 is a block diagram of a HB frequency domain (FD) mode of the METD.

FIG. 5 shows HB FD mode operation. $S_F$ is connected to the oscillator 202, switch $S_B$ to a $R_1C_1$ circuit and close $S_D$. This results in a low inductance coil in a resonance circuit. $S_G$ may have poor resistance characteristic (e.g., typical of high speed, high kickback voltage IGBT) for low total power consumption. A low on resistance switch $S_D$ is provided for those cases: $S_D$ would be closed. $R_D^1$ and $R_D^2$ are in the 50 to 200 ohm range and has little effect on the FD mode operation. $S_E$ can either be open or closed.

It has been found theoretically and experimentally that the resonance frequency of small metal targets characteristic of low metal content land mines is in the range of about 50–80 KHz. Therefore, a metal detector operating around the resonance frequency of the metal target has the potential for maximum sensitivity. Hence, the METD bandwidth of the transmitter and receiver should be adjusted to about 50–80 KHz. This is lower than the TD mode bandwidth requirements for fast decay targets and ground voids in mineralized soil. Therefore, the transmitter coil configuration in FIG. 3 must be adjusted for low bandwidth (LB) operation. A lower bandwidth inductor can have more coil turns for the same coil diameter. More coil turns increases the sensitivity of the detector to the small magnetic flux from the small targets.

Figure 6:
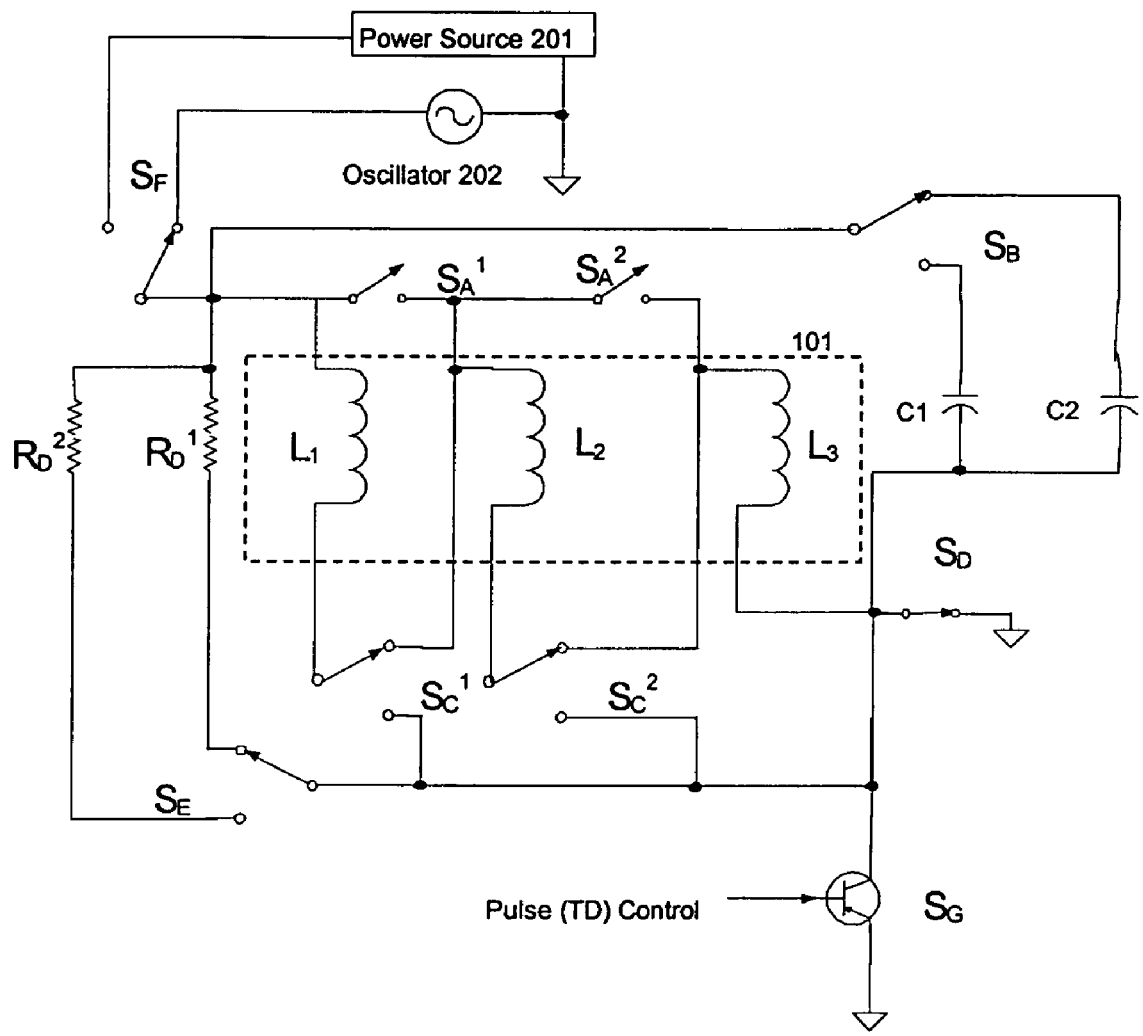
FIG. 6 is a block diagram of a low bandwidth (LB) FD mode of the METD.

FIG. 6 shows the configuration for LB FD mode operation. The objective of this circuit is to take the transmitter coils and make more coil turns for increased sensitivity. The LB FD mode has the following switch configuration: $S_F$ connected to oscillator, $S_A$, $S_E$ open, and $S_B$, $S_C$ and $S_D$ closed. $S_B$ can be configured for different resonance capacitor/resistor combinations depending of the operation frequency of the oscillator.

Up to now the discussion has centered on small targets and their detection. These small targets typically have metal content in the less than 10 gram range. A large fraction of metal targets have larger metal content than this. It is known that the larger the metal mass, the longer the time constant of the decay signature (assume the same type of metal and general physical size). A longer decay time means the frequency response of the sensor can be lower. The system of FIG. 3 can be reconfigured for TD mode operation with a LB transmitter coil.

Figure 7:
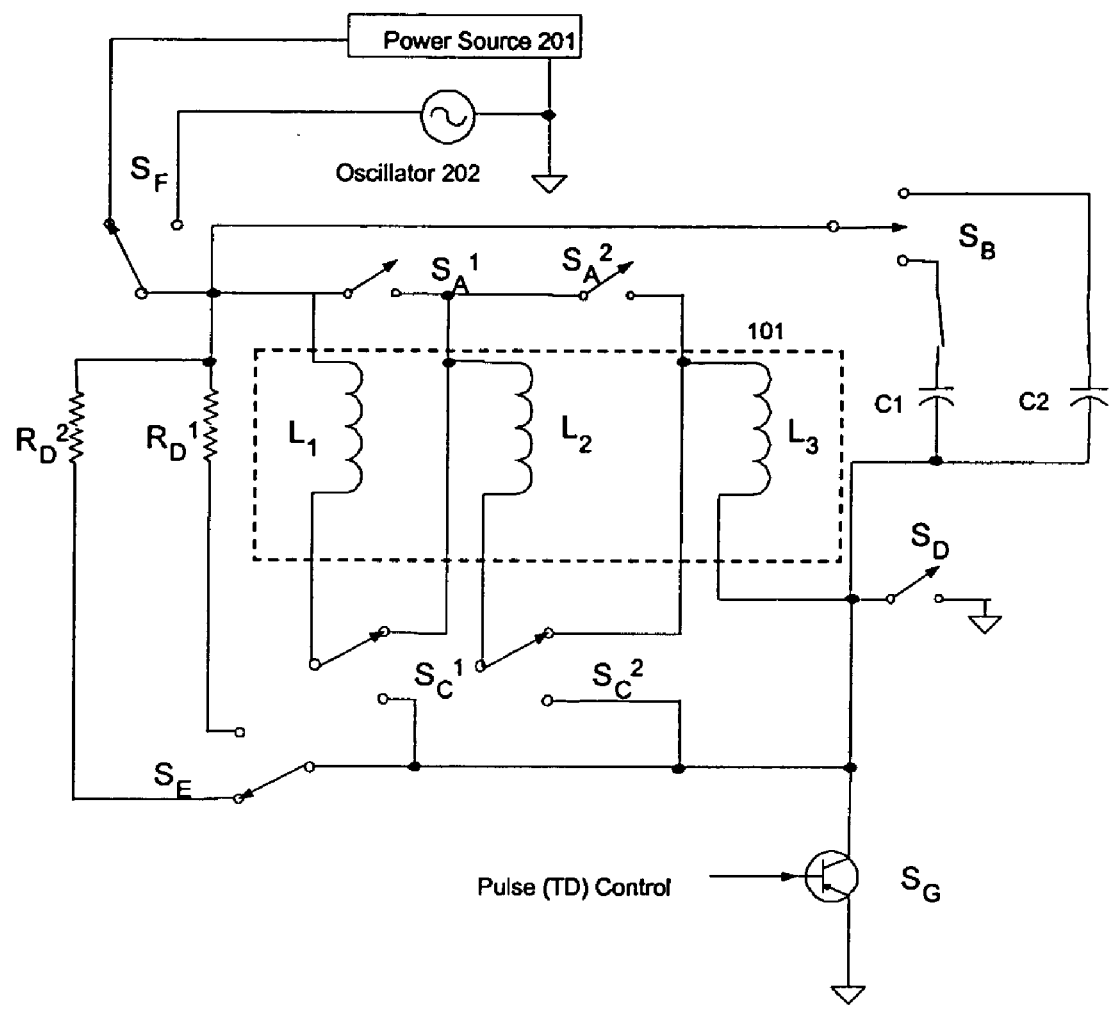
FIG. 7 is a block diagram of a LB TD mode of the METD.

FIG. 7 shows the switch configuration for LB TD mode. The inductance of the transmitter coil has been changed by the new configuration of switches. A new damping resistance value, provided by $R_D{}^2$ is needed to keep the coil from oscillating. $S_G$ control can also have a slower turn-off time since the target of interest's signature does not need to be measured close to the turn-off time of the transmitter. A slower turn-off time of the transmitter induces a lower voltage on the $S_G$ switch which is good from the stand point of circuit stress and high frequency transient noise.

Figure 8:
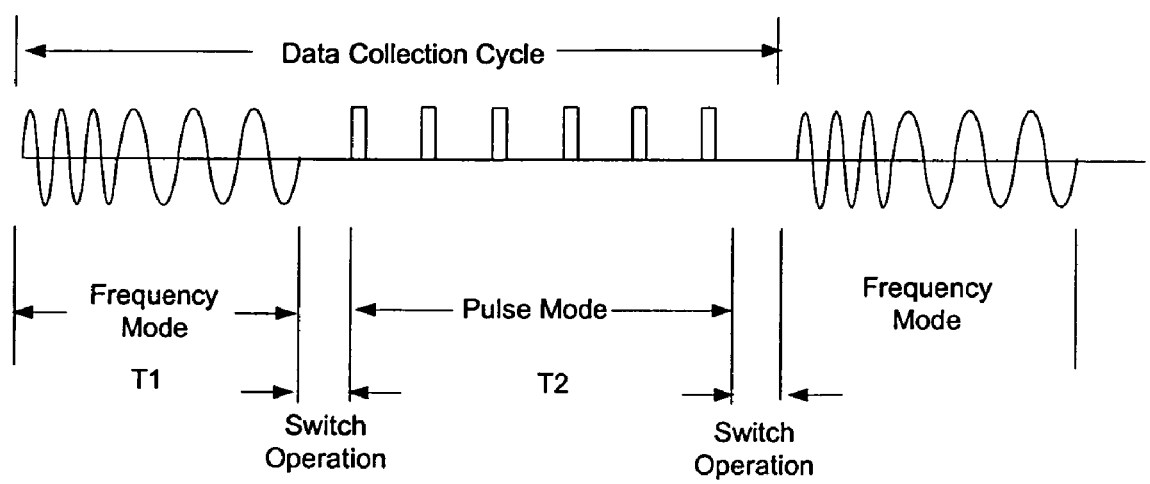
FIG. 8 is a basic METD timing diagram.

FIG. 8 shows the basic timing diagram of the METD sensor. Starting with the FD mode, the transmitter generates a series of frequencies, one at a time, that are connected to the transmitter coil via a resonance circuit. The resonance circuit creates a relatively large current flow in the transmitter coil at a low power consumption, which translates into a high magnetic field. Under ideal soil conditions, the FD mode will produce high sensitivity to deep small metal targets and tell us whether the target is ferrous and non-ferrous (most low metal content (LMC) mines have a dominant non-ferrous component). After FD data is collected for a period T1, a switch is activated by the CD 106 to connect the transmitter coil 101 to the TD circuit. The METD then collects TD data for a period of T2. A series of short duty cycle, wide bandwidth, high current pulses are sent to the transmitter coil. In the TD mode, ground voids and fast decay metal targets may be measured. The TD mode will collect time decay response measurements over a time period of about 50–100 µs. This is an adequate time window for low-metal content mine classification. Typically, 200 ensemble averages are performed to reduce broadband noise.

An estimate of data collection time can be developed as follows:

| | |
|---|---|
| T1 (2 frequency; ~100 averages) = | 30 ms |
| T2 (pulsed; ~200 averages) = | 20 ms |
| Electro-mechanical Switches = | 20 ms |
| Data collection cycle time = | 70 ms |

As stated earlier, metal targets can be classified into two broad categories: LMC and high metal content (HMC) targets. Normally, the METD is operated in the LMC mode (nominal parameters described above) for the detection and classification of LMC mines. When an HMC target is encountered, the METD sensor settings will saturate the amplifiers of the collection system. The METD will detect this condition and will adjust its operating parameters to optimize target classification. Transmitter power will be lowered to the point where the amplifiers are not saturated, and the sampling time window will be lengthened to measure the longer decay time of the HMC target.

As an example, a VS-50 AP mine contains about 16 grams of steel. Experimentally it has been determined that a time window of about 500 µs is needed for classification (see FIG. 3). According to United Nations humanitarian demining sources, a Russian PMN mine (about 30 g of metal) accounts for roughly half of the mines in the world. Therefore, a metal detector with classification capability must be able to adjust its operating parameters to cover both LMC and HMC mines.

In the preferred embodiment of the present invention a single transmitter coil surrounds two receiver coils. The receiver coils are placed symmetrically inside the transmitter coil and connected in a figure '8' configuration. The figure '8' receiver coil configuration of counter windings nulls the primary transmitter signal. Other antenna configurations are possible and known to one skilled in the art.

Figure 9:
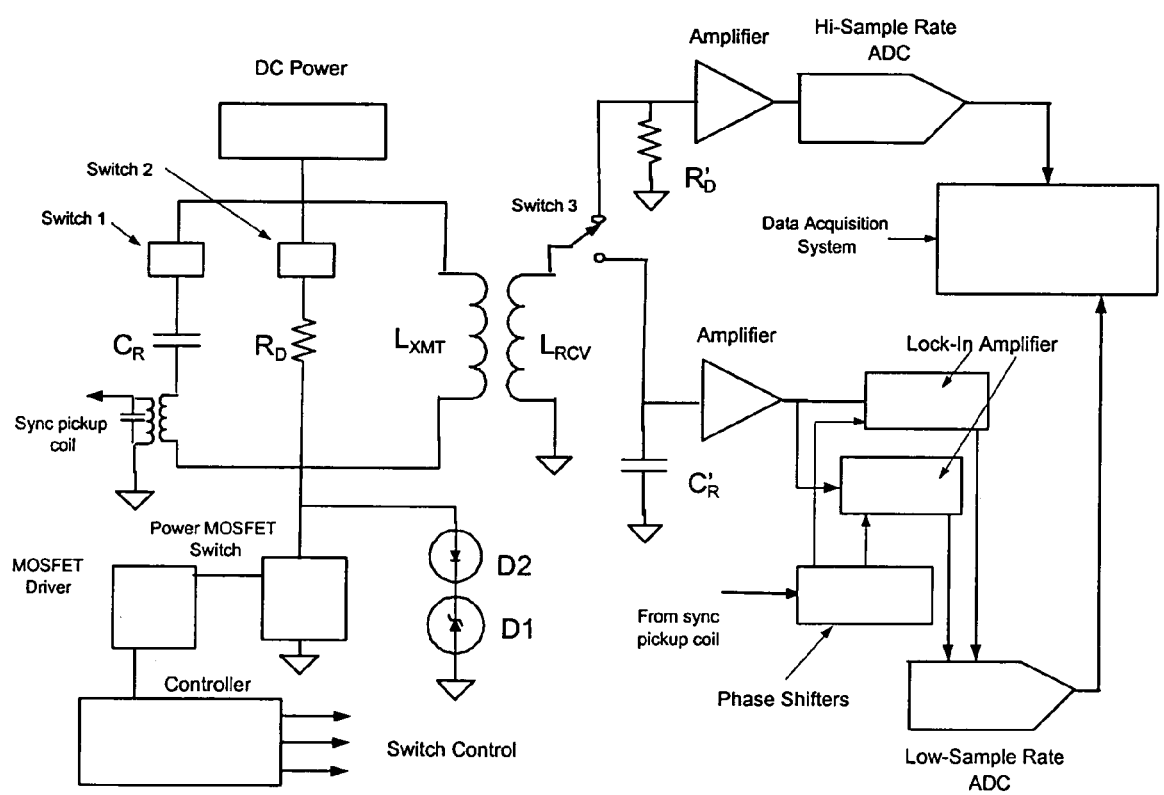
FIG. 9 is a block diagram of a second embodiment of the METD sensor with analog FD mode operation.

FIG. 9 shows a simplified drawing of the another embodiment of the present invention. FIG. 9 is a method that performs both TD and FD modes with one switch, in which case the 202 oscillator has been replaced by controlling the $S_G$ switch in FIGS. 3, 4, 5, 6 and 7. As explained earlier, FIG. 1 uses an oscillator to excite the antenna in the FD mode. The oscillator was shown to illustrate and simplify the explanation of FIGS. 3, 4, 5, 6 and 7. The approach using the oscillator and the switch to connect to the oscillator has an advantage since the oscillator can be one of many different designs based on the needs of the final sensor. For example, if one needs a sensor that has low broadband noise, a sinewave oscillator could be used as 202 since it is a single frequency and low broadband noise. Alternatively, the 202 oscillator could use a switching type power amplifier with extra filtering to lower the noise.

Returning again to FIG. 9, the transmitter is ordinarily a class E amplifier with switches that allow the damping resistor to be used in TD mode and a resonance capacitor in the FD mode. A single switch (Switch 3) controls the signal from the receiver coil. A high-speed amplifier and high-sample rate analog to digital converter (ADC) is used in the TD mode and a lock-in amplifier and low-speed ADC is used in the FD mode. A synchronization (sync) signal is derived from an inductive pick-up coil (with a resonance capacitor) in the FD mode transmitter circuit. The sync signal is used by the lock-in amplifier to synchronously demodulate the FD mode signal and provide an in-phase and quadrature signal to the low-sample rate ADC. The output of the ADC is sent to the data acquisition system for processing (detection and classification). Diode D1 protects the MOSFET switch during high kick-back voltage transients when the power MOSFET switch turns off high currents in the transmitter coil quickly. Diode D2 stops reverse current flow to ground through D1 during FD mode operation. Other methods are available for synchronous demodulation and the derivation of a sync signal, and one skilled in the art could implement a synchronous demodulator that accomplishes the same task as the lock-in amplifier described above.

Figure 10:
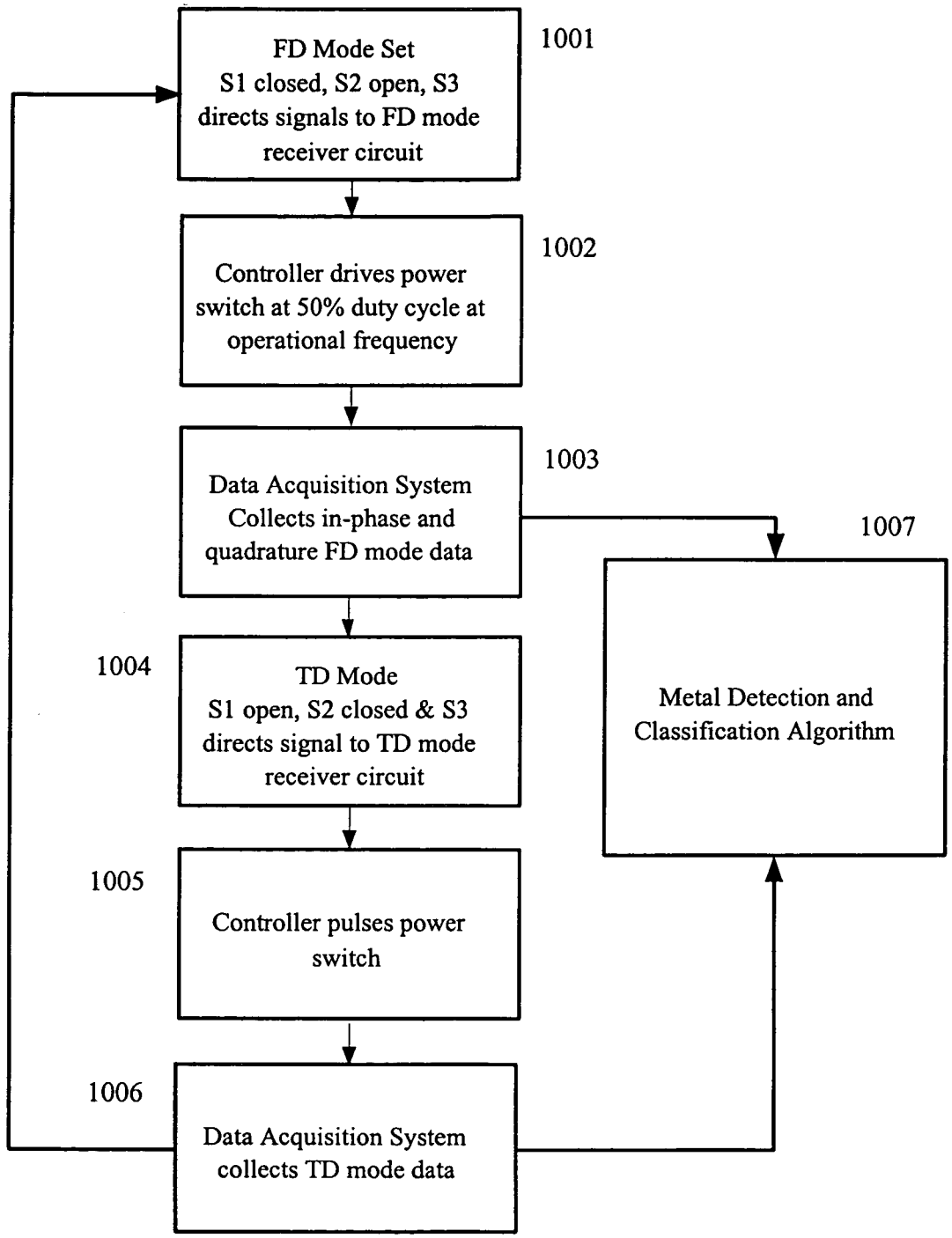
FIG. 10 is an operational flow chart of the METD system.

FIG. 10 is an operational flow chart where the FD and TD modes are operated continuously. Referring to FIGS. 9 and 10, in step 1001, in FD mode, the controller sets switch 1 closed, switch 2 open and switch 3 directs receiver coil signals to the FD mode lock-in amplifiers. No signal is sent to the MOSFET driver (one skilled in the art will know that a simple transistor driver can be used and other solid state switch devices can be used in place of the MOSFET switch).

Next, in step 1002, the controller sends a series of 50% duty cycle pulse to the MOSFET driver circuit at the desired frequency of the operation for FD mode. Typical frequencies range from 2 kHz to 100 kHz. The power MOSFET then switches at or near the resonance frequency of the circuit. The capacitor $C_R$ and inductor $L_{XMT}$ (i.e., transmitter coil) form a resonance circuit at the desired frequency of operation. The value of CR is selected so that the LC circuit resonances at the desired frequency. Current flows in the LC circuit creating a magnetic field that interacts with the environment and nearby metal objects. With switch 3 connected to the FD mode side of the circuit, the receiver coil and capacitor $C'_R$ are connected in parallel forming a resonance circuit at the FD mode operating frequency. The value of $C'_R$ is selected so that the LC circuit resonances at the desired frequency. An inductive pick-up coil samples the resonance frequency of the transmitter circuit and provides a synchronous signal to the lock-in amplifiers. One skilled in the art could derive other methods to develop a reference signal that is in phase with the transmitter signal. Phase shifters adjust the sync signal to provide 0° and 90° sync signals to the lock-in amplifiers for in-phase and quadrature outputs to the ADC. Since the frequency of operation of FD mode is slow compared to the TD mode (e.g., a factor of 10 or more lower), a high bit resolution, low-sample-rate ADC may be used. Alternatively, the same ADC that is used by the high-sample rate TD mode may be used but with a lower sample rate (see FIG. 11). A lower sample rate lowers the overall power requirements for the sensor.

Next in step 1003, the data acquisition system collects in-phase and quadrature data for metal detection and classification purposes. After a set time (e.g., a few tens of milliseconds that is dependent on operating frequency and desired signal to noise) of FD mode operation, the controller stops sending pulse signals to the MOSFET driver. Since the transmitter coil circuit is in a relatively high Q configuration and significant currents are flowing in the circuit, a set time is allowed for the oscillatory currents in the transmitter coil to die out before switch 1 is opened. This advantageously prevents high inductive kick-back voltages to be developed across switch 1. If desired, a Q-damping circuit known in the art could be added to hasten the current damping after the transmitter control pulses have stopped.

In step 1004, in TD mode, switch 1 is open, switch 2 is closed and switch 3 directs the receive coil signals to the TD mode circuit. No signal is sent to the MOSFET driver while the switches are changing from FD to TD mode. Damping resistors ($R_D$ and $R'_D$) are now connected in parallel with the transmitter coil ($L_{XMT}$) and receiver coil ($L_{RCV}$) to dampen any oscillatory behavior of the coils when pulsed with short turn-off time currents from the transmitter coil. After the switches are placed in the TD mode configuration, the controller, in step 1005, sends pulse controls to the MOSFET driver which in turn controls the power MOSFET switch. The duration of the on and off time of the power MOSFET in the TD mode is controlled by the controller.

In step 1006, the data acquisition system collects data from the receiver coil for metal detection and classification purposes. In step 1007, the information from the TD mode is processed by the metal detection and classification algorithm. The operation is then repeated.

The above operation has assumed continuous operation in FD and TD modes. Alternative operations are possible and follow the general operation as outlined above. In one alternative operational mode, the metal detector could be operated in continuous FD mode to conserve power. If a metal anomaly was detected by the FD mode, the TD mode could then be manually or automatically activated for metal classification. In another alternative operational mode, the metal detector could be operated in continuous FD mode with more than one operational frequency, again to conserve power. With two or more frequencies, it is known in the art that ground effects can be minimized for improved detection of small metal objects. If a metal anomaly was detected by the multiple frequency FD mode, the TD mode could then be manually or automatically activated for metal classification. In another alternative operational mode, the metal detector could be operated in continuous TD mode with a reduced duty cycle to conserve power. For example, this mode could be used in an environment where the FD mode does not operate effectively (as indicated in Table 2) such as salt water. If a metal anomaly was detected by the low duty cycle TD mode, the TD mode could then be changed to a high duty cycle for improved signal averaging manually or automatically for improved metal classification. These are just three examples of many different modes of operation that can tailor the METD for operation in different environments and for different metal target types.

Figure 11:
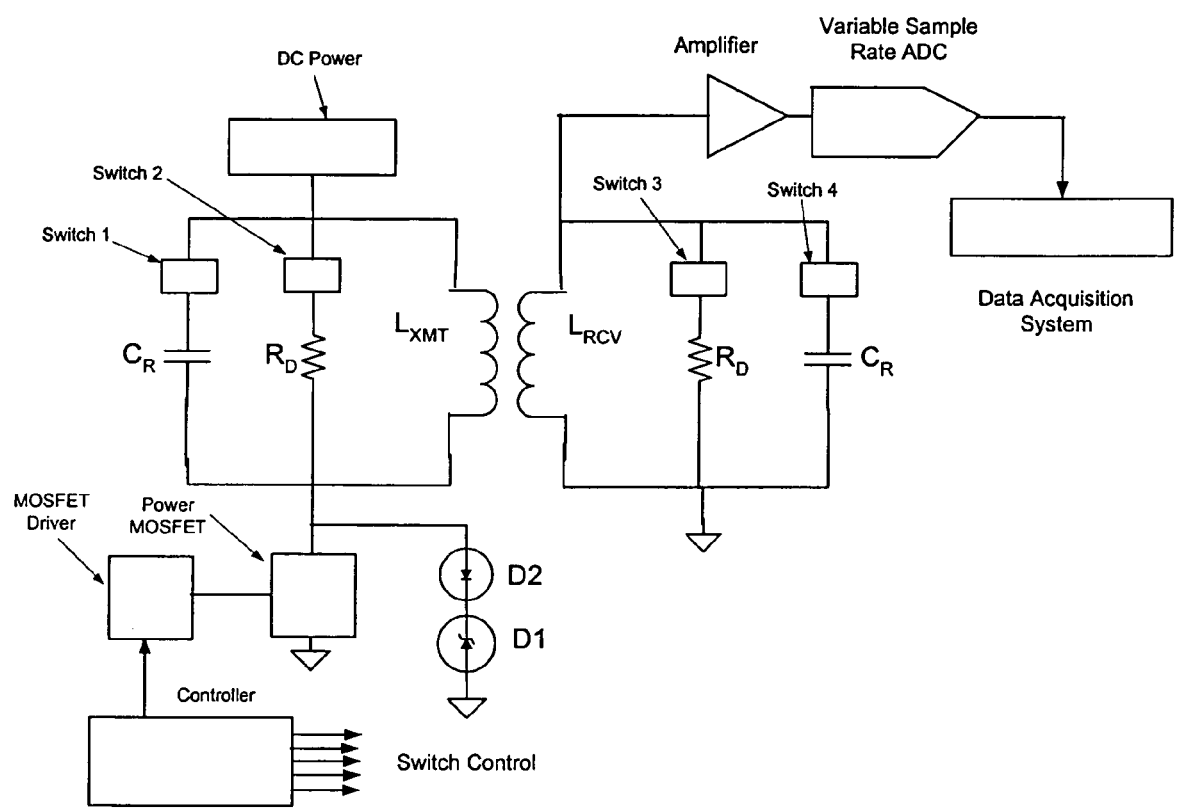
FIG. 11 is diagram of a METD sensor with digital FD mode operation.

An alternative METD circuit configuration is shown in FIG. 11. The basic difference between FIG. 9 and FIG. 11 circuits is that FIG. 11 uses a digital FD mode operation and fewer amplifiers and ADCs. The receiver circuit is approximately a mirror image of the transmitter circuit. Switches 3 and 4 are added to place a damping resistor in parallel with the receiver coil in the TD mode and a resonance capacitor in parallel with the receiver coil in the FD mode. A single amplifier section is used to amplify both the TD and FD signals (possibly with different gain settings) and a single ADC is used to digitize the amplified receiver coil signal. The sample rate of the ADC is adjusted for high speed (e.g., 5 Msamples/s) for TD mode and low sample rate (e.g., 100 Ksamples/s) for the FD mode. Synchronous detection of the FD mode signal could be performed digitally in the data acquisition system computer to form the in-phase and quadrature signals. A digital sync signal could be derived from the digital transmitter pulse control. The output of the ADC is sent to the data acquisition system for processing (detection and classification). Operation of the circuit in FIG. 11 is similar to the circuit in FIG. 9.

It is to be understood that the controller and data acquisition system devices could be incorporated into the same device. Also, the detection and classification algorithm could be incorporated into the same device and interface to the operator via conventional visual and or acoustic means.

Many such devices can be used for these functions. One skilled in the art has many choices and the selection of these devices depend on many variables such as cost, power consumption, temperature range, etc.

Figure 12:
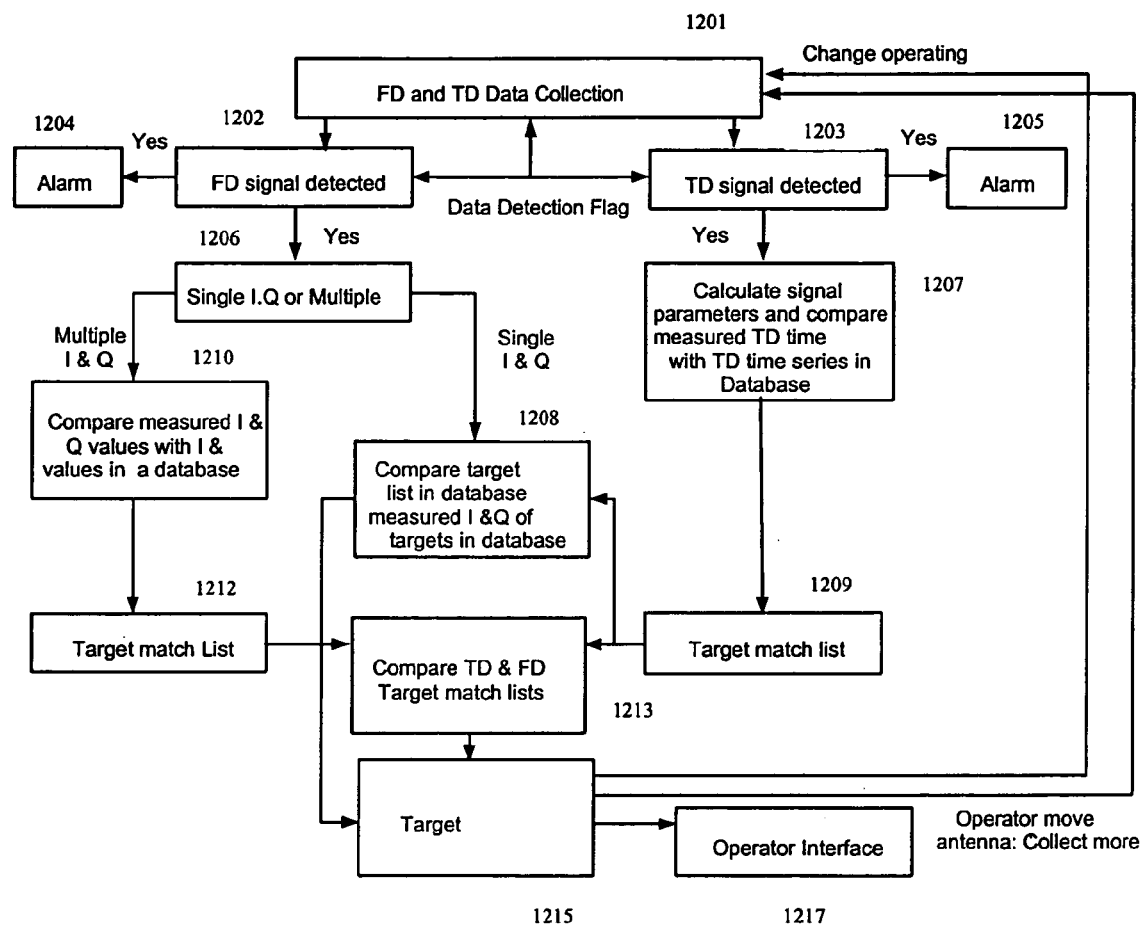
FIG. 12 is a diagram of a METD FD and TD data classification algorithm.

FIG. 12 is a block diagram of the METD FD and TD data classification algorithm. The METD collects FD and TD data nearly simultaneously. A variety of separate FD and TD algorithms are known in the art that detect and classify metal targets. The METD fuses the separate detection and classification algorithms into one device as shown in FIG. 12. The algorithm execution could be preformed in the data acquisition system. Combining the FD and TD data improves target detection and classification. Referring to FIG. 12, the basic operation of the algorithm is as follows. In step 1201 FD and TD data are collected by the data collection system (DCS). The FD and TD data are first sent to algorithms that determine whether there are FD, step 1202, or TD, step 1203, signals. The operation of this function could compare the amplitude of the I (in-phase) and Q (quadrature) values and energy of the TD data with some preset threshold value or a statistical value (e.g., average, standard deviation) derived from previous data collections such as during a background calibration. Other statistical tests are possible and one skilled in the art can easily implement. If no I/Q or TD signals are detected, the algorithm sends a 'No' data detection flag to the DCS and waits for more data from the DCS. If I/Q or TD signals are detected an FD alarm in step 1204 or a TD alarm in step 1205 is sounded as a target detection. Since FD and TD data are different in nature, the alarms are different so that the operator knows which method detected the potential metal anomaly. In addition, if the I/Q (FD) or TD signals are detected, a 'Yes' data detection flag is sent to the DCS. An automatic parameter control software known in the art can, at this time, adjust the operational parameters (sampling time, current in coil, frequency of FD mode, etc) of the METD for optimal signal collection.

At this point in the process there are three possible data detection flag combinations that are important and will now be addressed. First, if the TD data detection flag is 'No' and the FD data detection flag is 'Yes' and the FD mode is a single frequency, the algorithm stops trying to estimate the target classification since there is insufficient information for good classification. Second, if the TD data detection flag is 'No' and the FD data detection flag is 'Yes' and the METD is using multiple frequencies, the algorithm continues to estimate the target classification but sets an alarm so that the operator knows that only FD mode is estimating the target classification. Third, if the FD data detection flag is 'No' and the TD data detection flag is 'Yes', the algorithm continues to estimate the target classification but sets an alarm so that the operator knows that only TD mode is estimating the target classification. Assuming that TD and FD signals are detected, the algorithm proceeds to the classification mode.

For FD mode, the algorithm branches in step 1206 depending on the detection of single or multiple frequencies. If single frequency data are measured, the I/Q values are estimated and compared with TD data as described below with respect to step 1208. If multiple frequency data are measured, the I/Q values are sent to a routine that compares in step 1210 the measured I/Q values as a function of frequency with a database of important metal targets. These targets could include landmines, coins, frequently encountered clutter (shell casing, nuts and bolts, etc). Many statistical estimators known in the art could be used to calculate a measure of how well the measure I/Q data compare to the I/Q in the database. For FD mode multiple frequencies, the statistical estimator of step 1210 will output in step 1212 a list of potential targets along with an estimate of goodness of match to targets of interest. For example, in the case of a landmine detector, the list would include landmines and in the case of a hobbyist metal detector, the list would include coins, gold nuggets or clutter. Many statistical estimates of goodness of match are known in the art and could be used.

For TD mode, in step 1207, several different parameters are extracted from the time series data for target classification. From previous TD mode algorithms, these parameters include signal amplitude, time decay estimates, match-filter output, void detection, depth estimation, etc. The parameters are compared in a statistical fashion (e.g., match filter, regression analysis for time decay estimates known in the art) with parameters stored in a database of important targets (as described above). The statistical estimator will output in step 1209 a list of potential targets along with an estimate of goodness of match to targets of interest.

In step 1213 the FD and TD potential target match lists are then compared. The results of the comparison are output in step 1215. An estimate of the target's classification along with some type of confidence indicator is then presented to the operator. Multiple targets may be in the list and presented to the operator for final judgment. If only one frequency is available from the FD mode, the I/Q values are compared in step 1208 to the database I/Q values of the best match TD mode target list and a confidence value is adjusted for target classification.

The output targets are then displayed on an operator interface in step 1217. The operator interface could include a target list with confidence rating, estimated signal to noise level, and which modes were used to calculate the target classification (e.g., FD and TD combined, TD only, FD only). The process can be repeated for additional data scans over the target (more data from the DCS). Additional statistical comparisons as described above can be used to increase the confidence level of the target's classification. Spatial information could also be incorporated in the target classification process by directing the operator to place the sensor head at the center and edges of the target's minimum detectable signal. Many targets have different signature properties based on the direction of the magnetic excitation field. Making spatial measurements as suggested, improves target classification.

Once an estimate of a metal anomaly classification has been developed, the results of the classification process could be feed back to the DCS for improved classification via further processing. Consider the case of a low metal target with very low signal to noise in the collected data. If the first run through the classification process indicates a target that is similar to a landmine but not conclusive, the parameters of the DCS could be adjusted to optimize for low metal landmines with a particular metal signature. Remember, in search mode, the METD is looking for anything and everything. Once an estimate of the type of target is established, the sensor's operating parameters can be changed to look for a specific type of target depending on the type of environment. For example, the resonance frequency of low metal landmines are known in advance. The TD and FD modes can be adjusted to operate at the resonance frequency of the low metal landmine with the potential of improved signal to noise.

In a further embodiment of the present invention, an autonomous robotic vehicle version of the system would replicate the operation of a human operator using a single sensor swinging back-and-forth over a search area. The METD could be easily implemented with this approach. For this embodiment, the metal detection sensors are placed on a robotic vehicle. Implementing a metal detector on an autonomous, moving platform is more difficult than a handheld implementation. In the robotic application, the benefits of a skilled operator are no longer available to move the detector and assist in the classification algorithm. The metal detector must be designed to compensate for these capability losses.

Figure 13:
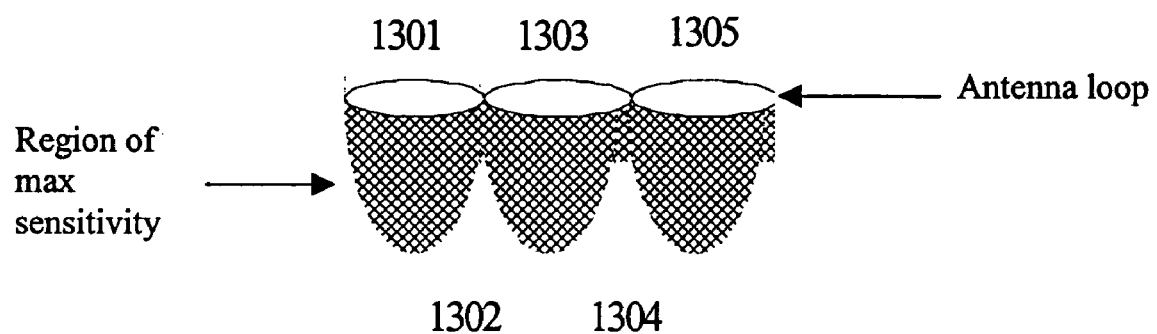
FIG. 13 is a simplified view of conical detection region as function of depth of non-overlapping metal detectors.

FIG. 13 shows a simplified view of the detection sensitivity of a small array of non-overlapping metal detectors as a function of depth. Basically, the region of maximum sensitivity can be thought of as rounded-off cones 1301, 1303 and 1305 with the apex of the cone pointing downward. The figure clearly shows that there are detection gaps 1302 and 1304 deep under a simple linear detector array. A rule of thumb is a metal detector is sensitive to small targets to a depth approximately equal to the antenna's diameter. The figure shows that for deep targets we need to have the target close to the antenna's center (e.g., about one-half an antenna diameter).

Figure 14:
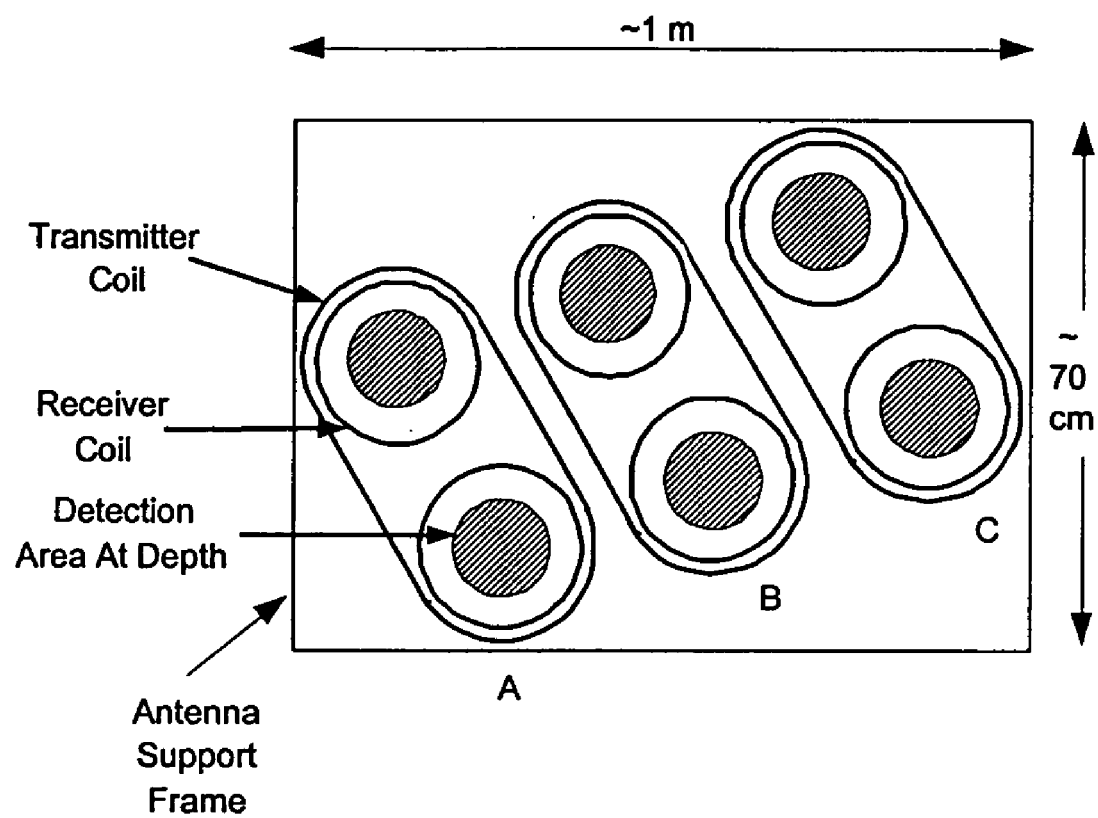
FIG. 14 is a diagram of a METD sensor array with 3 differential antennas.
Figure 15:
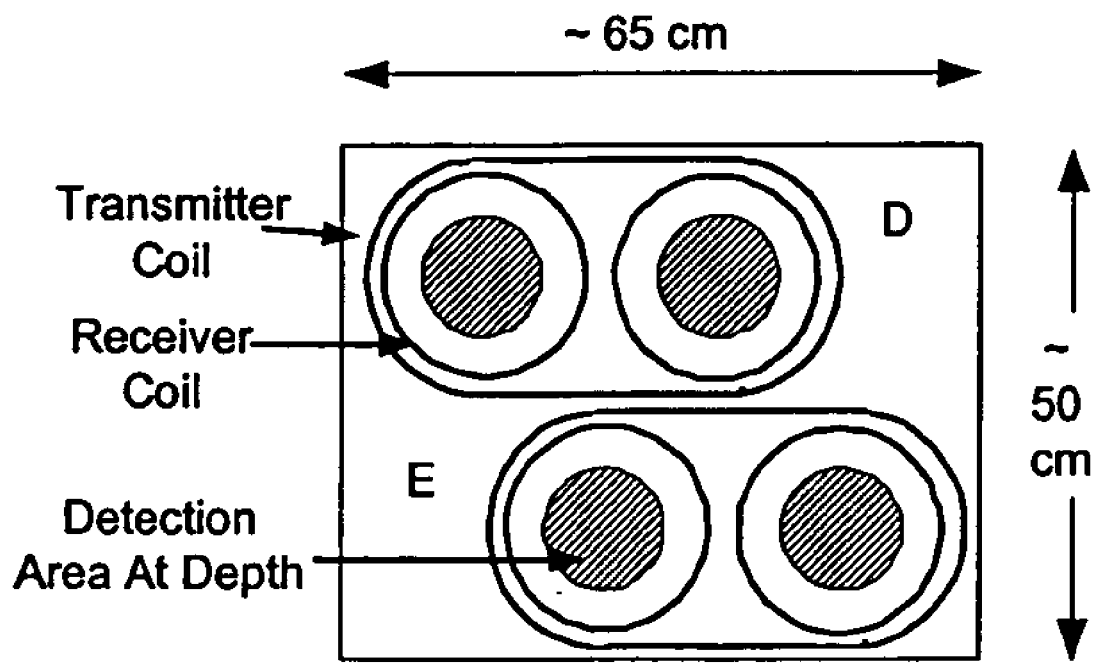
FIG. 15 is a block diagram of a METD sensor array with 2 differential antennas.

FIG. 14 shows an array of three differential METD antennas A, B and C, about 22 cm in diameter, in an overlapping antenna design. The overlapping antennas cover the sensitivity gaps that a single antenna would have at depth. Other array and METD configurations may be possible as shown in FIG. 15, which uses two METD sensors D and E in a more compact layout. The hatched area is approximate detection area at about 22 cm depth.

An extension to the above antenna switching concepts can be applied to the problem of antenna diameter and target depth. It can be easily shown that for a circular loop and for transmitting and receiving on the same loop, the optimal radius of the 'antenna' for a given detection depth is given by:

$$\text{Loop Radius} = \text{sqrt}(2) * (\text{Depth}) \qquad \text{Equation (2)}.$$

A small antenna is optimal for a shallow target (one that is close to the antenna plane). A deeper target is best detected with a larger antenna diameter. The switches described above can be configured in such a way that the antenna depth range is the property that is optimized and not the antenna bandwidth. In this case, the switches configure the antenna for different diameters instead of different bandwidths.

Using the array in FIG. 14 and assuming a forward speed of 10 cm/s, an estimate of coverage rate (CR) is:

$$CR = \text{Sensor Width} * \text{Forward Speed} = 1\ m * 0.1\ m/s = 0.1\ m^2/s = 6\ m^2/\text{min} \qquad \text{Equation (3)}.$$

The spatial sampling distance calculation in Equation 3 showed that the METD sensor could make measurements about every 0.7 cm at a forward speed of about 10 cm/s. For the METD metal detector, it could be possible to double (about 12 $m^2$/min) or even triple (about 18 $m^2$/min) the speed of the platform.

Figure 16:
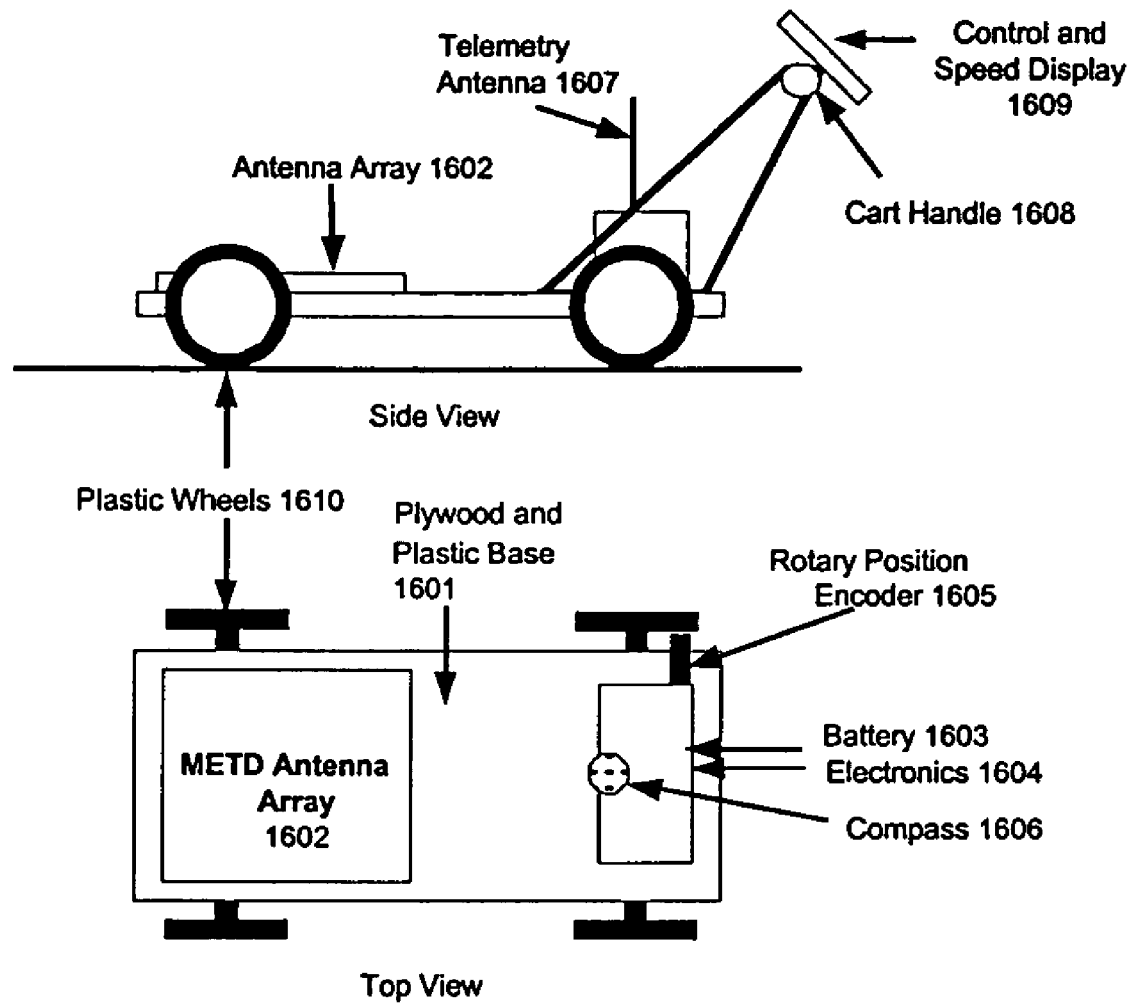
FIG. 16 is a block diagram of the METD system on a surrogate robotic platform (SRP) according to another embodiment of the present invention.

A simplified diagram of a surrogate robotic platform (SRP) is shown in FIG. 16. The low-cost SRP 1600, constructed of non-metallic materials provides a mechanical base 1601 for mounting the METD sensor array 1602 and holding the batteries 1603 that power the sensor. Plastic wheels 1610 are also provided. The SRP 1600 has the ability to vary the height of the sensor array 1602 so that various detection depths are capable. Speed/distance traveled and direction sensors 1604 are incorporated in the platform 1601 via a rotary position encoder 1605 and compass 1606. Data from the METD sensor array can be transmitted via antenna 1607 to a remote base station (not shown) where it is archived and analyzed. The base station can comprise a laptop computer with a wireless network receiver. Various detection and classification algorithms may be implemented in near real-time by the base station laptop computer. Near real-time evaluation of sensor performance will enhance data collection effectiveness. A cart handle 1608 is supplied for manual moving of the SRP. Also, a display 1609 can be mounted on the SRP to provide manual use or setup programming.

As can be seen from the foregoing description, the multi-mode electromagnetic target discrimination sensor system as disclosed herein solves the individual deficiencies of a sole time domain or frequency domain system. Also, the ability to reconfigure the antenna coils to adapt to differing targets or soil conditions greatly improves on the prior art systems.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A multi-mode electromagnetic target discrimination sensor system for transmitting an electromagnetic signal and receiving a reflected signal, comprising:
   a variable inductance antenna having a variable inductance transmitter and a variable inductance receiver for varying at least one of operating bandwidth, sensitivity and size of the antenna;
   a processor for alternating between a time domain operating mode and a frequency domain operating mode, and controlling the variation of the inductance of the variable inductance antenna based on a current operating mode; and,
   at least one processing algorithm for receiving signals from the receiver, discriminating targets from the received signals, and outputting the discrimination results.

2. The multi-mode electromagnetic target discrimination sensor system of claim 1, wherein the variable inductance transmitter further comprises:
   at least two transmitter inductance windings connectable in parallel or series; and,
   transmitter switching circuitry for connecting the at least two transmitter inductance windings in parallel or series under the control of the processor.

3. The multi-mode electromagnetic target discrimination sensor system of claim 2, wherein the variable inductance transmitter further comprises:
   at least one resistor for dampening oscillations; and,
   at least one resonance circuit for maximizing current flow in the windings.

4. The multi-mode electromagnetic target discrimination sensor system of claim 2, wherein the variable inductance transmitter further comprises:
   at least two receiver inductance windings connectable in parallel or series; and
   receiver switching circuitry for connecting the at least two receiver inductance windings in parallel or series under the control of the processor,
   wherein the receiver inductance windings are connected in accordance with the transmitter inductance windings.

5. The multi-mode electromagnetic target discrimination sensor system of claim 4, wherein the variable inductance transmitter further comprises:

at least one resistor for dampening oscillations; and at least one resonance circuit for maximizing current flow in the windings.

6. The multi-mode electromagnetic target discrimination sensor system of claim 4, wherein the system is mountable on a robotic platform to enable at least one of automatic and remote operations.

7. The multi-mode electromagnetic target discrimination sensor system of claim 6, further comprising at least two antennas mounted in the same horizontal plane to a bottom of the robotic platform, wherein the at least two antennas are offset from each other for providing an overlapping coverage pattern.

8. The multi-mode electromagnetic target discrimination sensor system of claim 1, wherein the system operates in the frequency domain mode until a signal is received, and then alternately operating in the frequency domain mode and the time domain mode.

9. The multi-mode electromagnetic target discrimination sensor system of claim 1, further comprising a data classification table containing at least one of signal amplitude, time decay estimates, match-filter output, void detection, and depth estimation of at least one target or soil condition.

10. A method of target discrimination in a multi-mode electromagnetic target discrimination system, comprising the steps of:
   a) setting an antenna, having at least one transmitter coil winding and at least one receiver coil winding, to a frequency domain mode, transmitting frequency domain mode signals, and receiving reflected frequency domain mode signals;
   b) processing in processing circuitry the received frequency domain signals to classify the frequency domain signals;
   c) setting the antenna to a time domain mode, transmitting time domain mode signals, and receiving reflected time domain mode signals;
   d) processing in the processing circuitry the received time domain signals to classify time domain signals;
   e) returning to step a).

11. The method of target discrimination in a multi-mode electromagnetic target discrimination system of claim 10, wherein the operation cycle from a to d is less than 70 ms.

12. The method of target discrimination in a multi-mode electromagnetic target discrimination system of claim 10, wherein the setting of the antenna in the frequency domain mode and the time domain mode are based on at least one of a desired operating bandwidth, a desired antenna sensitivity, and a desired antenna size.

13. The method of target discrimination in a multi-mode electromagnetic target discrimination system of claim 10, wherein the antenna has more than one transmitter or receiver coil windings, and the step of setting the antenna comprises the steps of connecting the more than one transmitter or receiver coil windings in parallel or series to adjust at least one of a bandwidth, a sensitivity, and a size.

14. The method of target discrimination in a multi-mode electromagnetic target discrimination system of claim 12, further comprising the step of adjusting at least one of the operating bandwidth, antenna sensitivity and antenna size.

15. The method of target discrimination in a multi-mode electromagnetic target discrimination system of claim 10, wherein the system operates in the frequency domain mode until a signal is received, and then alternately operates in the frequency domain mode and the time domain mode.

16. The method of target discrimination in a multi-mode electromagnetic target discrimination system of claim 10, wherein at least one of signal amplitude, time decay estimates, match-filter output, void detection, and depth estimation of at least one target or soil condition is stored in a data classification table.

17. A method of target discrimination in a multi-mode electromagnetic target discrimination system, comprising the steps of:
   a) detecting at least one of a frequency domain (FD) signal and time domain (TD) signal from reflected electromagnetic signals;
   b) if a FD signal is detected, classifying the FD signal;
   c) if a TD signal is detected, classifying the TD signal;
   d) comparing the classified FD and TD signals;
   e) outputting the comparison results; and,
   f) returning to step a).

18. The method of target discrimination in a multi-mode electromagnetic target discrimination system of claim 17, wherein an alarm is outputted if either an FD or a TD signal is detected.

19. The method of target discrimination in a multi-mode electromagnetic target discrimination system of claim 18, wherein the output alarm is distinct for a FD signal or a TD signal.

20. The method of target discrimination in a multi-mode electromagnetic target discrimination system of claim 17, wherein step (b) further comprises the steps of:
   determining a number of frequencies detected in the FD data; and,
   matching each detected frequency to at least one possible target.

21. The method of target discrimination in a multi-mode electromagnetic target discrimination system of claim 20, wherein if only one FD frequency is determined and no TD signals are detected, the process is ended.

22. The method of target discrimination in a multi-mode electromagnetic target discrimination system of claim 20, wherein FD signals are detected by comparing the amplitude of I (in-phase) and Q (quadrature phase) components of the detected FD signal.

23. The method of target discrimination in a multi-mode electromagnetic target discrimination system of claim 20, wherein TD signals are detected by comparing the energy of the detected TD signals with a threshold value.

24. The method of target discrimination in a multi-mode electromagnetic target discrimination system of claim 17, wherein the system operates in a frequency domain mode until a signal is received, and then alternately operates in the frequency domain mode and a time domain mode.

25. The method of target discrimination in a multi-mode electromagnetic target discrimination system of claim 17, wherein at least one of signal amplitude, time decay estimates, match-filter output, void detection, and depth estimation of at least one target or soil condition is stored in a data classification table.

* * * * *